United States Patent
Oikawa

(10) Patent No.: US 11,267,394 B2
(45) Date of Patent: Mar. 8, 2022

(54) PROJECTION APPARATUS FOR INDICATING A RECOMMENDED POSITION TO OBSERVE A MOVABLE BODY, PORTABLE DEVICE, AND RECORDING MEDIUM

(71) Applicant: ALPINE ELECTRONICS, INC., Tokyo (JP)

(72) Inventor: Taku Oikawa, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/666,618

(22) Filed: Oct. 29, 2019

(65) Prior Publication Data

US 2020/0156534 A1    May 21, 2020

(30) Foreign Application Priority Data

Nov. 19, 2018  (JP) .............................. JP2018-216843
Jul. 16, 2019  (JP) .............................. JP2019-131368

(51) Int. Cl.
  *B60Q 1/50*    (2006.01)
  *G05D 1/00*    (2006.01)
  *G05D 1/02*    (2020.01)

(52) U.S. Cl.
  CPC ............. *B60Q 1/50* (2013.01); *G05D 1/0088* (2013.01); *G05D 1/0214* (2013.01); *G05D 1/0236* (2013.01); *B60Q 2400/50* (2013.01)

(58) Field of Classification Search
  CPC .. B60Q 2400/50; B60Q 2400/40; B60Q 1/50; B62D 15/0285; G05D 1/0214; G05D 1/0088; G05D 1/0236; G08G 1/168
  See application file for complete search history.

(56) References Cited

U.S. PATENT DOCUMENTS

| | | | | |
|---|---|---|---|---|
| 9,637,117 | B1 * | 5/2017 | Gusikhin | G08G 1/14 |
| 9,878,709 | B2 * | 1/2018 | Gusikhin | G08G 1/14 |
| 10,217,361 | B2 * | 2/2019 | Jung | G08G 1/166 |
| 10,380,817 | B2 * | 8/2019 | Kim | E05B 81/78 |
| 10,399,483 | B2 * | 9/2019 | Johnson | F21S 43/26 |
| 10,406,979 | B2 * | 9/2019 | Kim | B60K 35/00 |
| 10,421,391 | B2 * | 9/2019 | Kim | B60Q 1/16 |
| 10,528,829 | B2 * | 1/2020 | Kim | G06T 7/73 |

(Continued)

FOREIGN PATENT DOCUMENTS

| | | |
|---|---|---|
| EP | 3299838 | 3/2018 |
| EP | 3401191 | 11/2018 |

(Continued)

OTHER PUBLICATIONS

European Extended Search for 19209961.2 dated Apr. 20, 2020.

*Primary Examiner* — Bao-Luan Q Le
(74) *Attorney, Agent, or Firm* — IPUSA, PLLC

(57) ABSTRACT

A projection apparatus for use with a movable body is provided. The projection apparatus includes a parking controller configured to cause the movable body to automatically move to a parking space, and a projector configured to project light onto a road surface in vicinity of the movable body. When the parking controller causes the movable body to automatically park in the parking space, the projector projects the light onto the road surface located within a predetermined distance from the movable body.

11 Claims, 17 Drawing Sheets

(56) References Cited

U.S. PATENT DOCUMENTS

| | | | | |
|---|---|---|---|---|
| 10,580,304 | B2* | 3/2020 | Wheeler | B60Q 1/50 |
| 10,583,829 | B2* | 3/2020 | Kim | B62D 15/0285 |
| 10,583,830 | B2* | 3/2020 | Lavoie | G05D 1/0016 |
| 10,585,431 | B2* | 3/2020 | Golgiri | H04W 4/40 |
| 10,627,811 | B2* | 4/2020 | Golgiri | B60W 30/06 |
| 10,684,627 | B2* | 6/2020 | Lavoie | B62D 1/00 |
| 10,688,918 | B2* | 6/2020 | Elangovan | B60W 30/06 |
| 10,737,690 | B2* | 8/2020 | Lavoie | H04B 17/27 |
| 10,747,218 | B2* | 8/2020 | Lavoie | G05D 1/0038 |
| 10,814,864 | B2* | 10/2020 | Lavoie | G05D 1/027 |
| 2017/0132482 | A1* | 5/2017 | Kim | B60K 35/00 |
| 2017/0232961 | A1* | 8/2017 | Gusikhin | G05D 1/0246 |
| | | | | 701/23 |
| 2017/0334439 | A1* | 11/2017 | Lee | B60W 50/0097 |
| 2018/0004020 | A1* | 1/2018 | Kunii | B60Q 1/34 |
| 2018/0043819 | A1* | 2/2018 | Kim | B60Q 1/24 |
| 2018/0151009 | A1* | 5/2018 | Kim | E05B 81/78 |
| 2018/0174460 | A1* | 6/2018 | Jung | B60Q 1/525 |
| 2018/0257546 | A1* | 9/2018 | Johnson | B60Q 1/24 |
| 2018/0319325 | A1* | 11/2018 | Tatara | B60Q 1/0035 |
| 2018/0328750 | A1* | 11/2018 | Yun | B62D 15/0285 |
| 2018/0339654 | A1* | 11/2018 | Kim | G06T 13/80 |
| 2018/0345955 | A1* | 12/2018 | Kim | B62D 15/028 |
| 2019/0078373 | A1* | 3/2019 | Schulz | B60Q 1/0023 |
| 2019/0103027 | A1* | 4/2019 | Wheeler | G08G 1/133 |
| 2019/0111916 | A1* | 4/2019 | Lee | G08G 1/143 |
| 2019/0113933 | A1* | 4/2019 | Ha | G05D 1/0212 |
| 2019/0118801 | A1* | 4/2019 | Noh | G06K 9/00805 |
| 2019/0135169 | A1* | 5/2019 | Conger | G05D 1/0257 |
| 2019/0137990 | A1* | 5/2019 | Golgiri | G05D 1/005 |
| 2019/0202348 | A1* | 7/2019 | Elangovan | B60Q 1/48 |
| 2019/0202442 | A1* | 7/2019 | Lavoie | H04B 17/318 |
| 2019/0202443 | A1* | 7/2019 | Lavoie | H04B 17/27 |
| 2019/0202444 | A1* | 7/2019 | Golgiri | H04W 4/38 |
| 2019/0202445 | A1* | 7/2019 | Lavoie | G05D 1/0212 |
| 2019/0202446 | A1* | 7/2019 | Golgiri | G01C 21/165 |
| 2019/0204825 | A1* | 7/2019 | Golgiri | B60W 30/06 |
| 2019/0220001 | A1* | 7/2019 | Lavoie | B62D 15/0285 |
| 2019/0243380 | A1* | 8/2019 | Lavoie | G05D 1/0016 |
| 2019/0270405 | A1* | 9/2019 | Fukumoto | B60Q 1/50 |
| 2019/0276044 | A1* | 9/2019 | Bae | B60W 50/08 |
| 2019/0375397 | A1* | 12/2019 | Bae | B62D 15/027 |
| 2020/0001781 | A1* | 1/2020 | Sanders | H04N 5/23222 |
| 2020/0062173 | A1* | 2/2020 | Miyahara | B60Q 1/50 |

FOREIGN PATENT DOCUMENTS

| | | |
|---|---|---|
| JP | 2004-220257 | 8/2004 |
| JP | 2008-174192 | 7/2008 |

\* cited by examiner

FIG.12A
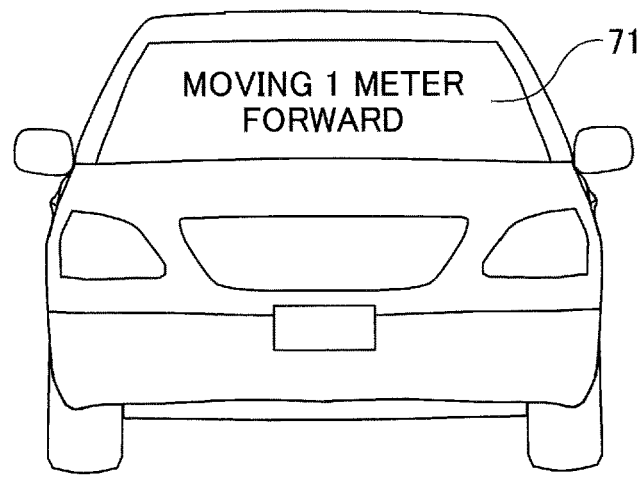
FIG.12B
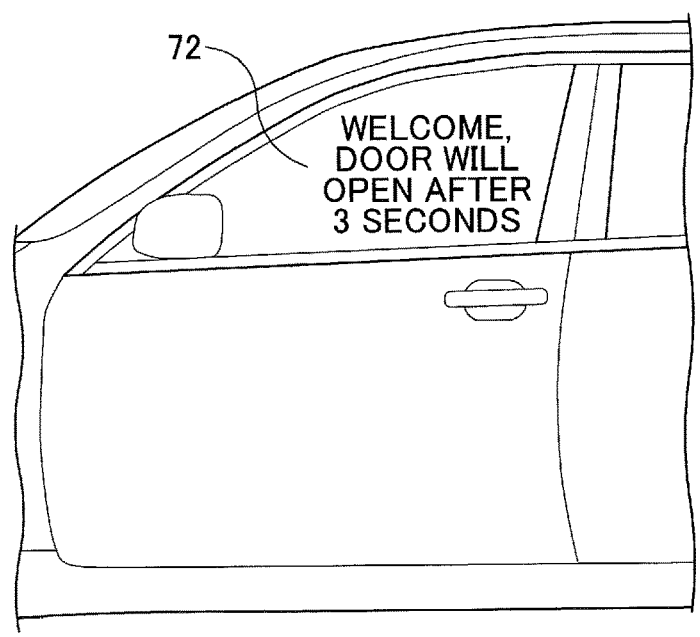
FIG.12C
3 ⇨ 2 ⇨ 1 ⇨ OPEN

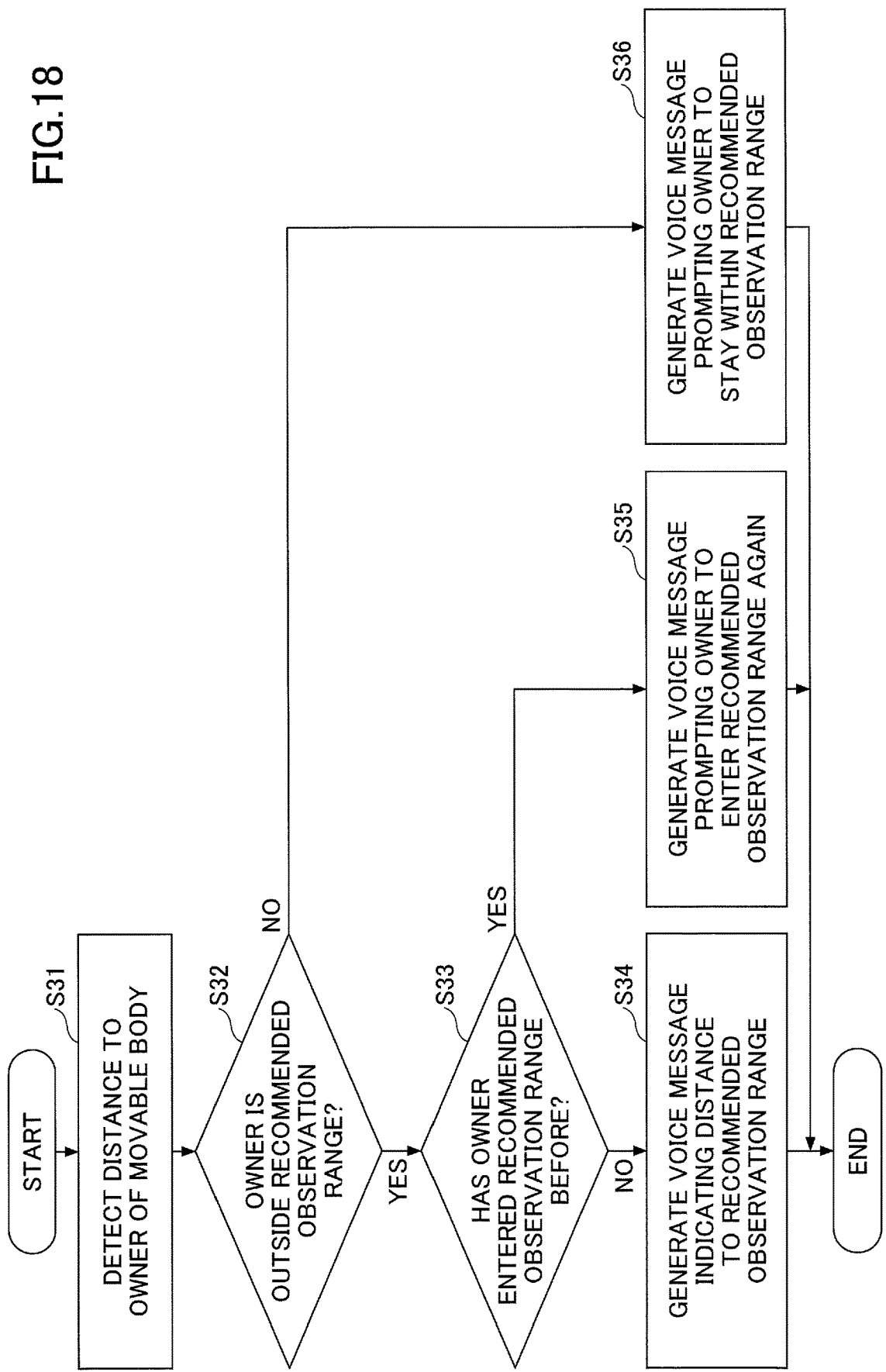

PROJECTION APPARATUS FOR INDICATING A RECOMMENDED POSITION TO OBSERVE A MOVABLE BODY, PORTABLE DEVICE, AND RECORDING MEDIUM

CROSS-REFERENCE TO RELATED APPLICATIONS

This application is based on and claims priority to Japanese Patent Application No. 2018-216843, filed on Nov. 19, 2018, and Japanese Patent Application No. 2019-131368, filed on Jul. 16, 2019, the entire contents of which are incorporated herein by reference.

BACKGROUND OF THE INVENTION

1. Field of the Invention

The disclosures herein relate to a projection apparatus for use with a movable body, a portable device, and a recording medium.

2. Description of the Related Art

A technology that projects a laser beam indicating the moving direction of a vehicle onto a road surface is known (see Patent Document 1, for example). Patent Document 1 describes a vehicle safety support device that projects a laser beam indicating a predicted driving trajectory of a vehicle onto a road surface.

According to the above technology, not only a driver of the movable body, but also people in the vicinity of the movable body are able to determine the moving direction of the movable body. For example, the driver is able to predict that the movable body may contact an obstacle at the time of parking. If there is a person in the vicinity of the movable body, the person is able to determine the moving direction of the movable body and move away from the movable body.

In recent years, technologies related to autonomous driving have been developed, in which a driver is not required to drive a movable body, and the movable body automatically drives itself while detecting surrounding conditions. In such autonomous driving, even if a driver (hereinafter referred to as an owner of a movable body as the driver is not necessarily required to drive the movable body) is not in the movable body, the movable body may move autonomously. Therefore, there are often cases where the owner of the movable body observes the autonomously moving movable body from the outside of the movable body.

In such cases, the owner desires to determine a suitable position to observe the autonomously moving movable body while predicting the moving direction of the movable body. In response to such a demand, as in the related-art technology, it is considered to project a predicted driving trajectory of the movable body onto the road surface. However, it would be difficult for the owner to determine a suitable position to observe the movable body based only on the driving trajectory.

For example, there may be situations where a movable body is parked automatically or is automatically driven to the entrance of the owner's house after leaving a garage. Movable bodies capable of moving autonomously are equipped with various sensors, but may sometimes fail to detect small obstacles. In such a case, if the owner of a movable body observes the movable body from the outside of the movable body, the owner may be able to stop the movable body from the outside. However, if the owner moves away from the movable body and is not monitoring the movable body, the movable body may contact an obstacle.

Therefore, in the future, in a situation where the owner observes a autonomously moving movable body from the outside of the movable body, the owner of the movable body may be legally required to stay within a specified distance from the movable body (e.g., 6 meters).

FIG. 1 schematically illustrates a range of 6 meters from a movable body. As illustrated in FIG. 1, it is desired that an owner 7 of a movable body 9 stay at a suitable position that is located within 6 meters from the movable body 9 and that does not hinder the movement of the movable body 9. However, it would not be easy for the owner 7 to instinctively determine the suitable position located within 6 meters from the movable body 9 that does not hinder the movement of the movable body 9 (an approximate distance from the movable body).

For example, it may be contemplated that a portable device carried by the owner of a movable body detects the distance from the movable body, and vibrates when the distance falls within or outside the range of 6 meters. However, the distance detected by radio waves may be inaccurate. In addition, based only on the distance, providing a suitable position that does not hinder the movement of the movable body would be difficult.

RELATED-ART DOCUMENTS

Patent Documents

Patent Document 1: Japanese Laid-Open Patent Publication No. 2004-220257

SUMMARY OF THE INVENTION

It is a general object of the present invention to provide a projection apparatus for use with a movable body, in which a suitable position for an owner of the movable body to observe the movable body during autonomous movement is presented.

According to an embodiment of the present invention, a projection apparatus for use with a movable body is provided. The projection apparatus includes a parking controller configured to cause the movable body to automatically move to a parking space, and a projector configured to project light onto a road surface in vicinity of the movable body. When the parking controller causes the movable body to automatically park in the parking space, the projector projects the light onto the road surface located within a predetermined distance from the movable body.

According to an embodiment of the present invention, a portable device for communicating with a projection apparatus for use with the movable body is provided. The projection apparatus includes a parking controller configured to cause the movable body to automatically park in a parking space, and a projector configured to project light onto a road surface in vicinity of the movable body. The portable device is configured to receive position information indicating a position located within a predetermined distance from the movable body, from the projection apparatus upon transmitting an instruction requesting the parking controller to start automatic parking to the projection apparatus, and highlight and display the position indicated by the position information in overhead view around the movable body.

According to an embodiment of the present invention, a non-transitory recording medium storing a program for causing a portable device configured to communicate with a projection apparatus for use with the movable body to execute a process is provided. The projection apparatus includes a parking controller configured to cause the movable body to automatically park in a parking space, and a projector configured to project light onto a road surface around the movable body. The process includes receiving position information indicating a position located within a predetermined distance from the movable body, from the projection apparatus upon transmitting an instruction requesting the parking controller to start automatic parking to the projection apparatus, and highlighting and displaying the position indicated by the position information in an overhead view around the movable body

BRIEF DESCRIPTION OF THE DRAWINGS

Other objects and further features of the present invention will be apparent from the following detailed description when read in conjunction with the accompanying drawings, in which:

FIG. 10A through FIG. 100 are drawings illustrating examples of projection light for assisting an occupant to enter the movable body;

FIG. 12A through FIG. 12C are drawings illustrating some messages displayed on transparent displays;

FIG. 18 is flowchart illustrating an example of a process in which the portable device outputs a voice message generated by a voice message generator.

DESCRIPTION OF THE EMBODIMENTS

According to an embodiment of the present invention, a projection apparatus for use with a movable body is provided, in which a suitable position for an owner of the movable body to observe the movable body during autonomous movement is presented.

In the following, embodiments of the present invention will be described with reference to the accompanying drawings.

First Embodiment

<Process Overview>

Figure 1:
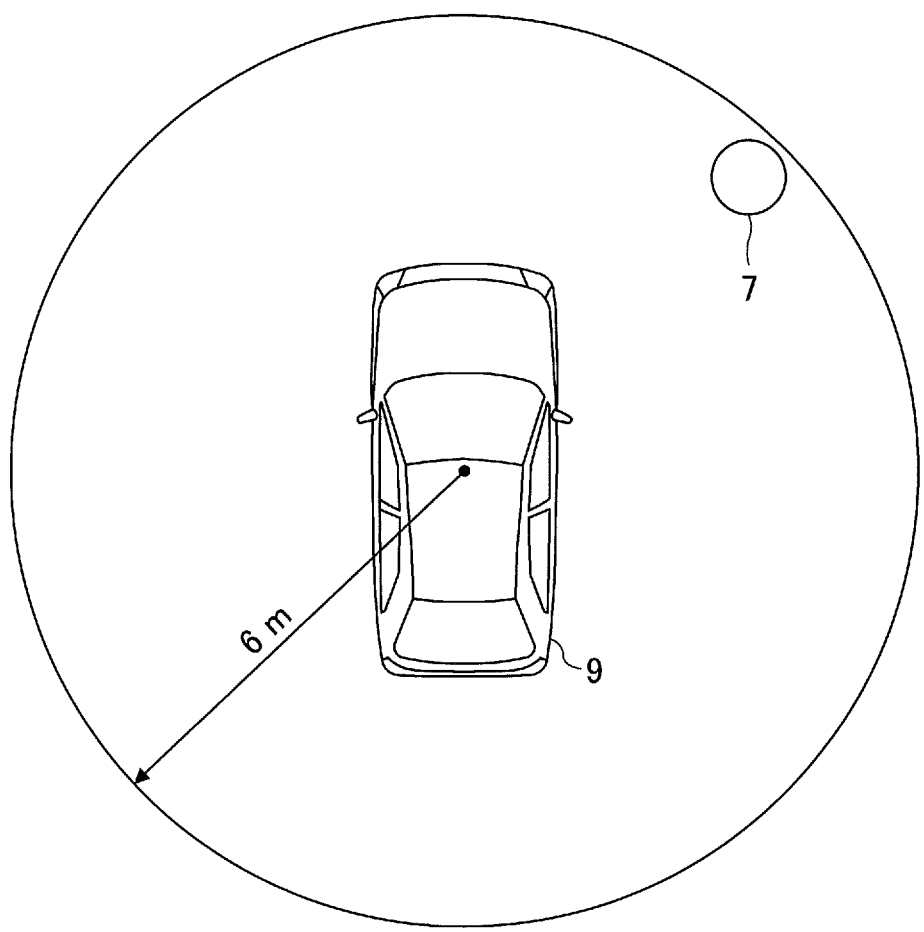
FIG. 1 is a drawing schematically illustrating a range of 6 meters from a movable body.
Figure 2:
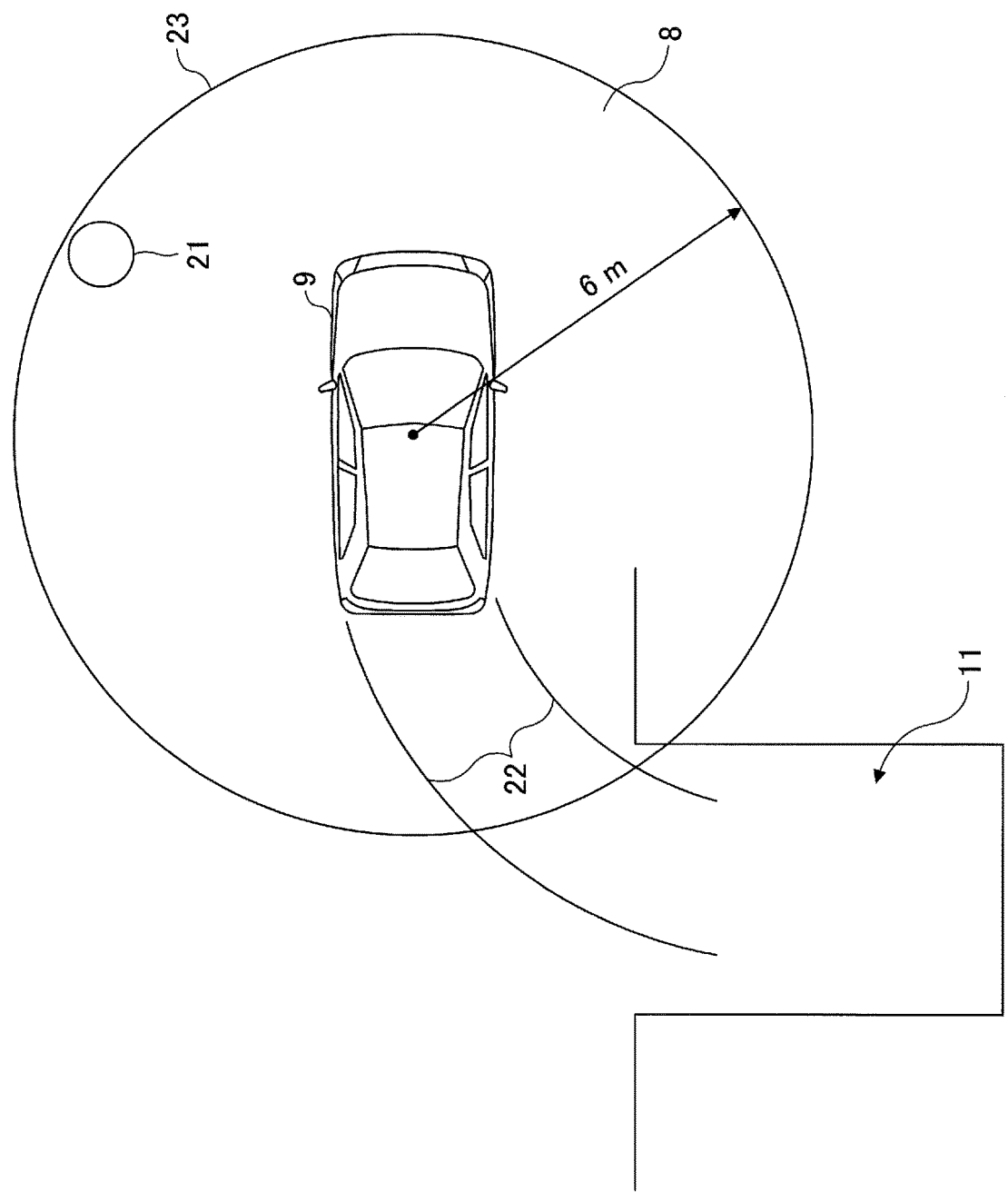
FIG. 2 is drawing illustrating an example of projection light projected by a projection apparatus for use with the movable body when viewed from overhead.

First, referring to FIG. 2, an overview of an observation position projected by a projection apparatus for use with the movable body according to a first embodiment will be described. FIG. 2 is drawing illustrating an example of projection light projected by the projection apparatus for use with the movable body when viewed from overhead. A movable body 9 is to be parked in a parking space 11 (such as a garage) in accordance with an instruction from the owner of the movable body 9. The position of the parking space 11 is identified by a camera or an ultrasonic sensor. Thus, the movable body 9 is able to predict a driving trajectory to the parking space 11. Further, a predetermined distance (such as 6 meters or less, which is hereinafter referred to as a "recommended observation range 8") from the current position of the movable body 9 can be determined based on a preset reference point, such as the center of the movable body 9.

The movable body 9 estimates an area that is located within the recommended observation range 8 and that does not overlap a driving trajectory, and project projection light 21 indicating a recommended observation position to this area. In FIG. 2, the projection light 21 indicating the recommended observation position is projected to an area on the left front side of the movable body 9. Accordingly, the owner of the movable body 9 can observe the movable body 9 at the recommended observation position that is located within the recommended observation range 8 and that does not overlap a driving trajectory, instead of instinctively determining an approximate distance from the movable body 9.

Further, the movable body 9 may also project projection light indicating the entirety of or the outer edge of the recommended observation range 8. In FIG. 2, projection light 23 indicating the outer edge of the recommended observation range 8 is depicted as a circle centered on the movable body 9. This allows the owner of the movable body 9 to recognize the recommended observation range 8 itself, and to observe the movable body 9 from a position within the recommended observation range 8 during automatic parking. Further, in FIG. 2, projection light 22 indicating a driving trajectory of the movable body 9 for automatic parking is also depicted. Accordingly, the owner of the movable body 9 can predict the moving direction of the movable body 9, and move within the recommended observation range 8 while avoiding the driving trajectory of the movable body 9.

Further, the owner of the movable body 9 carries a portable device 2 that communicates with the projection apparatus installed in the movable body. Accordingly, the owner of the movable body can start automatic parking from the outside of the vehicle (transmit an instruction to start automatic parking to the vehicle). The portable device 2 receives position information on a recommended observation position from the projection apparatus for use with the movable body, and displays the recommended observation position on a display of the portable device 2.

Terminology

The term "movable body" refers to an object that is movable on the ground by some power. Examples of the movable body include a vehicle and a wheelchair. Preferably, the movable body according to the present embodiment automatically moves itself.

The term "road surface" is a surface on which the movable body travels. In the present embodiment, the road surface includes a place called a parking lot; however, the road surface may include any place where the movable body is movable.

Projection of light refers to projection of an image of light or shadows. Specifically, projection of light means that what is termed as indirect light is made visible.

<Installation Positions of Projectors>

Figure 3:
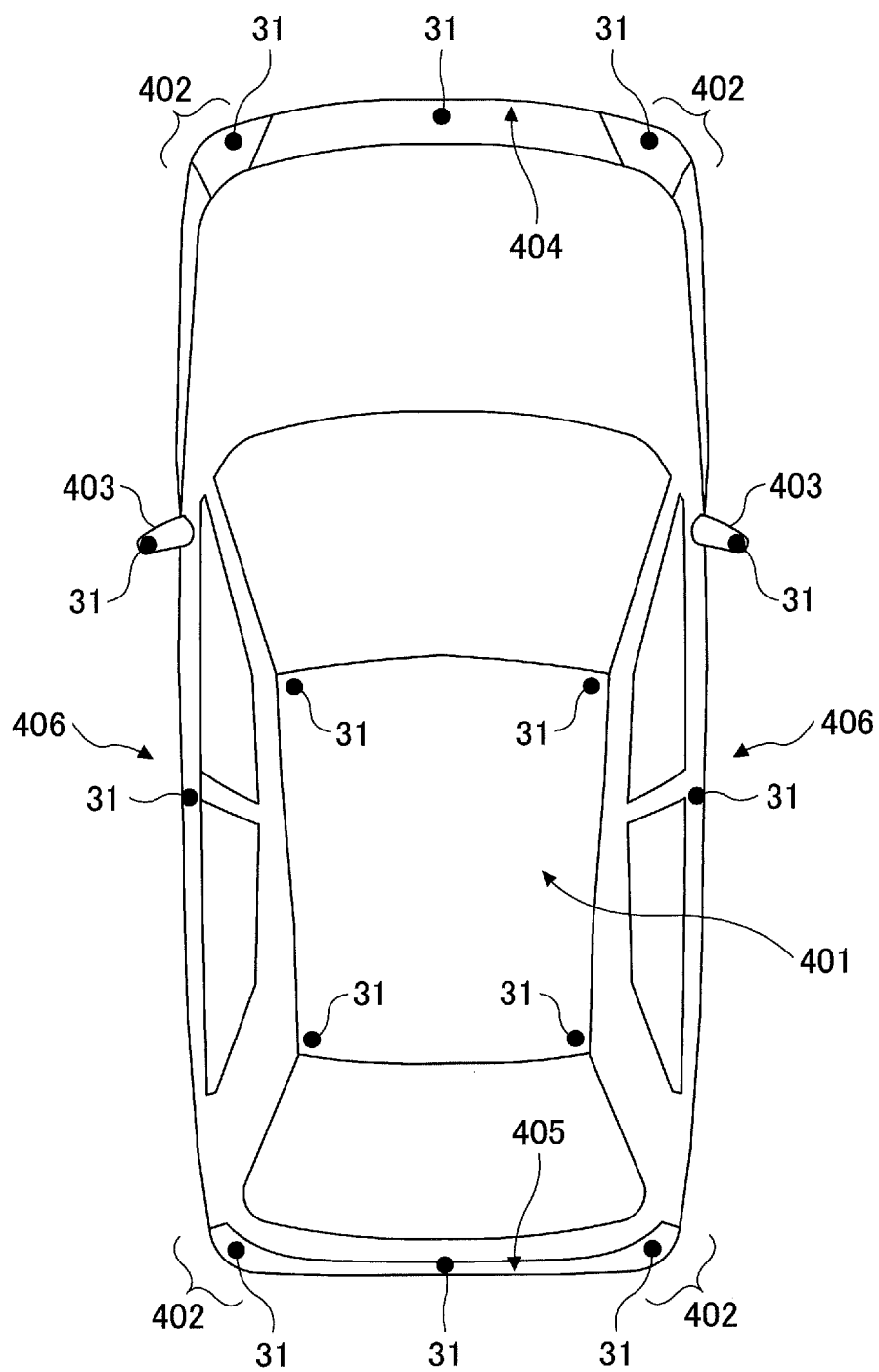
FIG. 3 is a drawing illustrating examples of positions of projectors installed on the movable body.

FIG. 3 is a drawing illustrating examples of positions of projectors 31 installed on the movable body 9. The projectors 31 are installed at positions from which at least the projection light 21 can be projected to a recommended observation position. Depending on the parking situation, a recommended observation position differs within the recommended observation range 8. Therefore, the projectors 31 are installed on the movable body 9 such that light can be projected to any position within the recommended observation range 8. For this reason, it may be effective to install a plurality of projectors 31, but one projector 31 may be installed.

As illustrated in FIG. 3, by installing the projectors 31 on the four corners of a roof 401, projection light can be projected to any position within the recommended observation range 8. The projectors 31 are not required to be installed on the roof 401, and may be installed on the four corners 402 of the vehicle body. Note that the projectors 31 may be used for purposes other than projecting the projection light 21 indicating a recommended observation position and the circular-shaped projection light 23 indicating the recommended observation range 8.

For example, the projectors 31 may be used to project the projection light 22 indicating a driving trajectory of the movable body 9 Further, the projectors 31 may be used to project ranges within which various operating units (mainly doors) are opened or closed. Alternatively, the projectors 31 may be used to project any characters. In order to project a variety of projection light beams, the projectors 31 may be installed on the center of a front bumper 404, the center of a rear bumper 405, a door mirror 403, the sides 406, and any position on the roof. In the following description, unless otherwise particularly specified, projection light is projected by projector(s) 31 installed at appropriate positions to project the projection light.

Example Configuration

Figure 4:
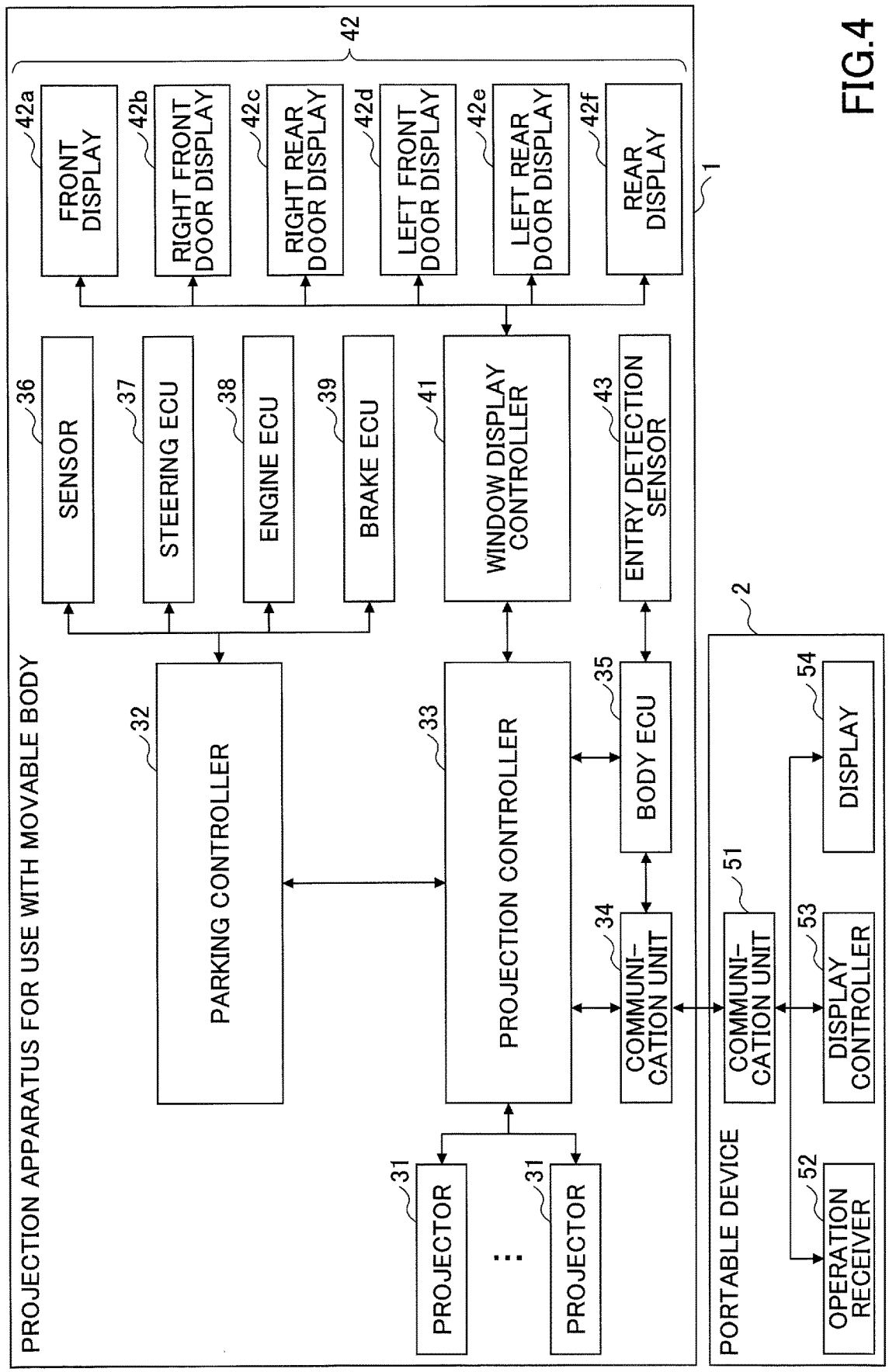
FIG. 4 is a drawing illustrating an example configuration of the projection apparatus installed in the movable body and an example configuration of a portable device.

Next, referring to FIG. 4, the configuration of a projection apparatus 1 for use with a movable body and the portable device 2 will be described. FIG. 4 is a drawing illustrating an example configuration of the projection apparatus 1 installed in the movable body 9 and an example configuration of the portable device 2. With reference to FIG. 4, not only projection of projection light for automatic parking, but also projection of projection light for assisting an occupant to enter the movable body 9 will be described. Further, the projection apparatus 1 for use with the movable body is a type of an in-vehicle apparatus, and may be referred to as a navigation apparatus, a tuner, a car audio, or a display audio.

<<Projection Apparatus for Movable Body>>

The entire projection apparatus 1 is controlled by a projection controller 33. In FIG. 4, one or more projectors 31, a parking controller 32, a window display controller 41, a communication unit 34, and a body electronic control unit (ECU) 35 are connected to the projection controller 33.

First, the projection controller 33 is a device called an information processing apparatus, a computer, or a microcomputer, including a CPU, a RAM, a flash memory, an input/output circuitry, and is installed as a board when put into practical use. The same may apply to other various types of controllers or ECUs.

Each of the projectors 31 uses a laser or a light emitting diode (LED) to project projection light of a given shape on a road surface. The details will be described with reference to FIG. 5 and FIG. 6.

The parking controller 32 is a device that performs control related to automatic parking. A sensor 36, a steering ECU 37, an engine ECU 38, and a brake ECU 39 are connected to the parking controller 32. The parking controller 32 detects the parking space 11 via the sensor 36 (the parking space 11 may be specified by the owner of the movable body), estimates a driving trajectory for parking in the parking space 11, and controls the steering ECU 37 so as to control the angle of the steering wheel in accordance with the estimated driving trajectory, while also controlling the engine ECU 38 to move the movable body 9 forward or backward. If an obstacle is detected or when the steering wheel is turned, the parking controller 32 controls the brake ECU 39 to stop the movable body 9.

The sensor 36 may include a camera capable of capturing a peripheral image, an ultrasonic sensor that detects an obstacle, and radar. However, devices included in the sensor 36 may differ depending on how the movable body 9 performs automatic parking. Further, for an electric vehicle or a hybrid vehicle, instead of the engine ECU 38, a motor ECU may be used to move the electric vehicle or the hybrid vehicle backward or forward.

The window display controller 41 displays information on transparent displays 42 placed on various windows of the movable body 9. That is, one or more of the windows of the movable body 9 have the displays 42 that are transparent and capable of displaying information. As illustrated in FIG. 4, the transparent displays 42 include a front display 42a, a right front door display 42b, a right rear door display 42c, a left front door display 42d, a left rear door display 42e, and a rear display 42f, which are connected to the window display controller 41. The window display controller 41 may display any information on the transparent displays 42.

In the present embodiment, when an occupant (including the owner of the movable body 9) approaches a door to enter the movable body 9, a message such as "the door will open" or "3, 2, 1, open!" may be displayed on a corresponding transparent display 42 of the door that the occupant is approaching. Further, at the time of automatic parking, a message such as "moving xx meters forward" may be displayed on the front display 42*a*, and a message such as "moving xx meters backward" may be displayed on the rear display 42*f*.

The communication unit 34 is a communication unit that communicates with the portable device 2 carried by the owner of the movable body 9. Communication methods such as frequency and modulation may vary depending on the movable body 9. Generic communication methods include Bluetooth (registered trademark) and a wireless LAN. When the movable body 9 is being parked, the communication unit 34 transmits a radio wave for searching the portable device 2 within a predetermined distance. When the portable device 2 detects the radio wave and transmits a pre-stored ID to the communication unit 34, the communication unit 34 detects the approach of the owner of the movable body 9. As a result, the door can be opened.

Further, in the present embodiment, when the owner of the movable body 9 exits the movable body 9, and performs an operation for starting parking on the portable device 2, the communication unit 34 receives the operation for starting parking, and the parking controller 32 performs the above-described parking control. In addition, the projection controller 33 controls the projectors 31 to project the projection light 21 indicating a recommended observation position. Further, the portable device 2 may receive, from the owner of the movable body 9, an operation for stopping the movable body 9 while the movable body 9 is moved in accordance with automatic parking control. Accordingly, even if there is an obstacle that is not detected by the sensor 36, the contact of the movable body 9 with the obstacle can be prevented.

Further, the projection controller 33 transmits a recommended observation position and the recommended observation range 8 to the portable device 2 via the communication unit 34 (if the recommended observation range 8 is fixed, the recommended observation range 8 is not required to be transmitted). Accordingly, the owner of the movable body 9 can check the recommended observation position and the recommended observation range 8 on a display 54 of the portable device 2. This may be effective when there is an obstacle in the vicinity of a projector 31, and the projector 31 is unable to project projection light 21 indicating a recommended observation position onto the road surface, or when the projection light 21 is projected in a blind spot of the owner of the movable body 9.

The body ECU 35 controls the locking, unlocking, opening, and closing of the doors. An entry detection sensor 43 is connected to the body ECU 35. The entry detection sensor 43 is a sensor that identifies a door that an occupant is approaching, determines the body size of the occupant who is approaching the door, and detects a surrounding obstacle. By utilizing the entry detection sensor 43 as a camera for capturing an image of the outside the vehicle from the inside, it is possible to detect a door that an occupant is approaching and the body size of the occupant who is approaching the door. Alternatively, the body size of the occupant may be detected by associating an ID transmitted from the portable device 2 with the occupant's attributes. Examples of the occupant's attributes include height, weight, gender, and age. By detecting the body size of the occupant, the body ECU 35 can open the door in accordance with the amount of opening that is not excessively large or small for the occupant to enter.

A surrounding obstacle may be detected by utilizing the entry detection sensor 43 as a camera (preferably a stereo camera) or an ultrasonic sensor. For example, if the movable body 9 is being parked in a small parking space 11 and a door is opened widely, the door may hit an obstacle (such as another vehicle or a wall). Thus, the entry detection sensor 43 detects a distance to the surrounding obstacle, and performs control that opens the door by a distance less than the detected distance.

The body ECU 35 sets the distance to a surrounding obstacle as the upper limit, and within the upper limit, determines the amount of opening based on the body size of an occupant. The body ECU 35 transmits, to the projection controller 33, information on which door to open and the amount of opening of the door. In accordance with the amount of opening of the door, the projection controller 33 projects projection light indicating how much the door may be opened. In addition, when the door is closed, it is preferable to project projection light alerting the occupant that the door is to be closed, or projection light indicating that how much the door may be closed (when the door is not completely closed, and the amount of opening is decreased).

Although not illustrated, an exit detector that detects the exit of the owner from the movable body may also be included. In this case, when the exit detector detects the exit of the owner from the movable body, the parking controller 32 may start automatic parking (namely, while the owner is in the movable body, the owner performs an operation for starting automatic parking upon detection of the exit of the owner). The exit detector may detect the exit of the owner based on a determination that the portable device 2 is located outside of the movable body (the portable device 2 communicates with an external antenna) and the doors are locked.

<<Portable Device>>

Next, the portable device 2 will be described. The portable device 2 is a terminal device carried by the owner of the movable body. The portable device 2 may be a device dedicated to communication with the projection apparatus 1, or may be a generic information processing device. For example, the portable device 2 may be a keyless entry key dedicated to communication with the projection apparatus 1. The keyless entry key is mainly used to unlock and lock the doors and start the engine. Examples of the generic information processing device include a smart device (a smartwatch, a wearable personal computer (PC), or the like), such as a personal smartphone of the owner. If the portable device 2 is a generic information processing device, a dedicated application (program) is installed on the projection apparatus 1.

The portable device 2 includes a communication unit 51, an operation receiver 52, a display controller 53, and the display 54. The communication unit 51 communicates with the communication unit 34 of the projection apparatus 1 in a wireless or wired manner. For example, the communication unit 51 transmits an instruction to start automatic parking, an emergency stop, or door opening, and receives position information of a recommended observation position and the recommended observation range 8.

The operation receiver 52 receives various operations performed on the portable device 2. The operation receiver 52 receives input of a hardware keyboard and input of a software keyboard displayed on a touch panel. As a result, the operation receiver 52 receives an instruction to start automatic parking, an emergency stop, or door opening.

The display controller 53 highlights a recommended observation position received by the communication unit 51, and displays the highlighted recommended observation position in an overhead view around the movable body 9. In addition, data indicating projection light, which can be projected by the projection apparatus 1, can be received and displayed by the portable device 2.

<Projectors>

Figure 5:
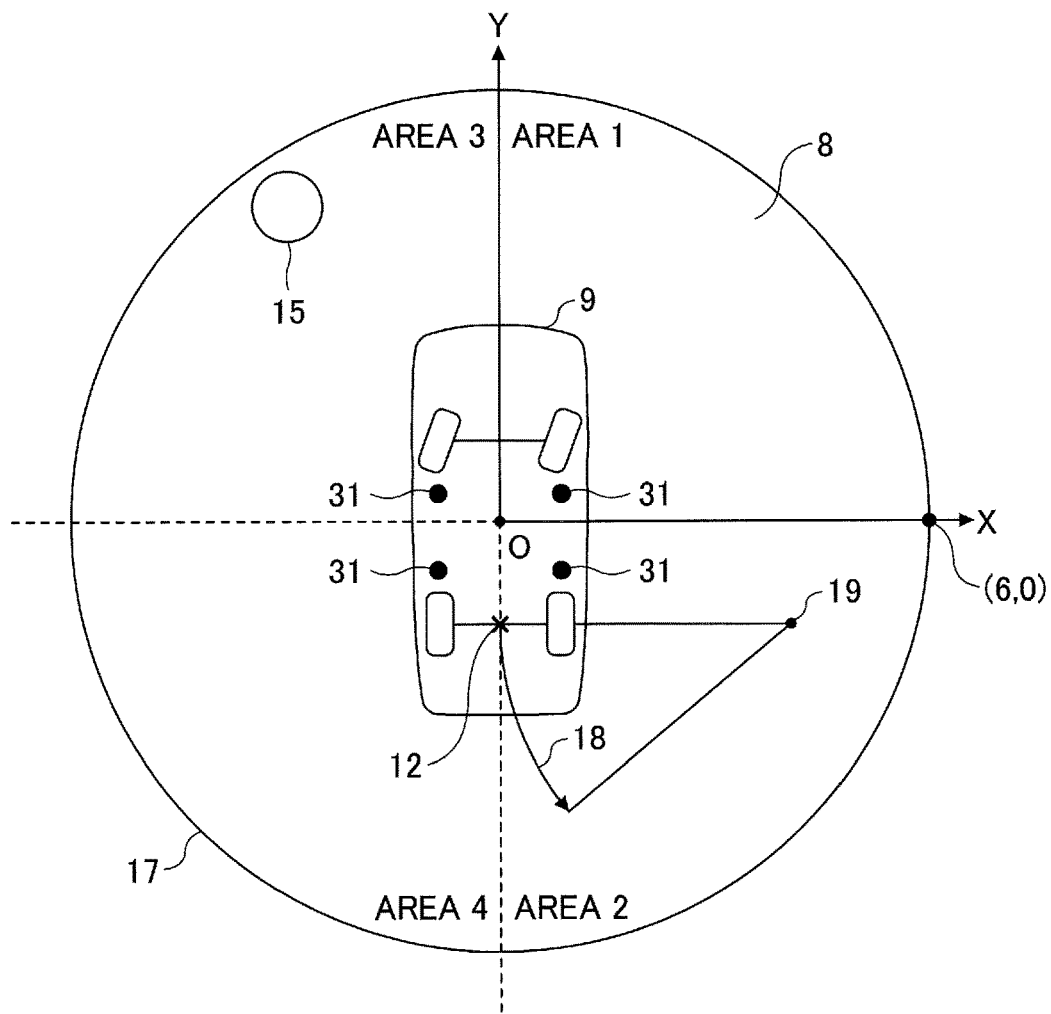
FIG. 5 is a drawing illustrating the movable body viewed from overhead and a coordinate system used by a projection controller.

Prior to the description of the projectors 31, coordinates used by the movable body will be described. FIG. 5 is a drawing illustrating the movable body 9 viewed from overhead and a coordinate system used by the projection controller 33. For example, the projection controller 33 manages the position of projection light in a two-dimensional coordinate system, with the origin O located at the center of the vehicle. In FIG. 5, the X-axis represents the width direction of the vehicle and the Y-axis represents the longitudinal direction of the vehicle. Projection light is generated as an image of the coordinate system. For example, because the outer edge of the recommended observation range 8 has a circular shape, the projection controller 33 creates an image of a circle 17 with the radius of 6 meters from the origin O. The coordinates of each point constituting the circle 17 are included in the image data. For example, the coordinates of a point at which the circle 17 intersects the X-axis are (6, 0). Note that the coordinate system is not required to be the same as the real space, and may be uniformly reduced in size.

If multiple projectors 31 are installed on the movable body 9, a projection range of each of the projectors 31 is determined beforehand. For example, if a total of four projectors 31 are installed on the four corners of the roof, an area 1 is assigned to an upper-right projector 31, an area 2 is assigned to a lower-right projector 31, an area 3 is assigned to an upper-left projector 31, and an area 4 is assigned to a lower-left projector 31. Therefore, each of the projectors 31 may determine a corresponding assigned area in accordance with the coordinates included in image data, and project projection light based only on the assigned area of the image data.

The same applies to the projection light 21 indicating a recommended observation position 15. The projection light 21 indicating the recommended observation position 15 is projected by a projector 31 assigned to an area in which the recommended observation position 15 is included (the area 3 in FIG. 5).

Figure 7A:
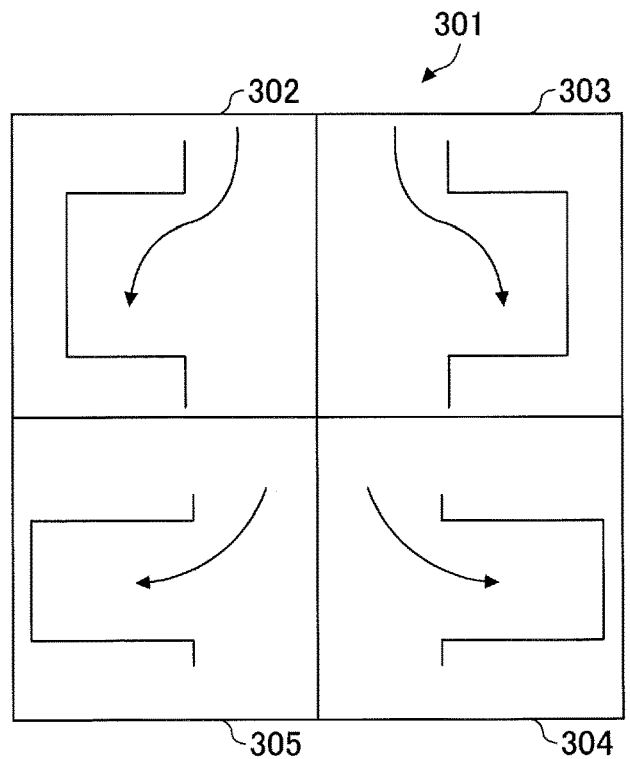
FIGS. 7A and 7B are drawings illustrating an example of estimating driving trajectories for automatic parking.
Figure 7B:
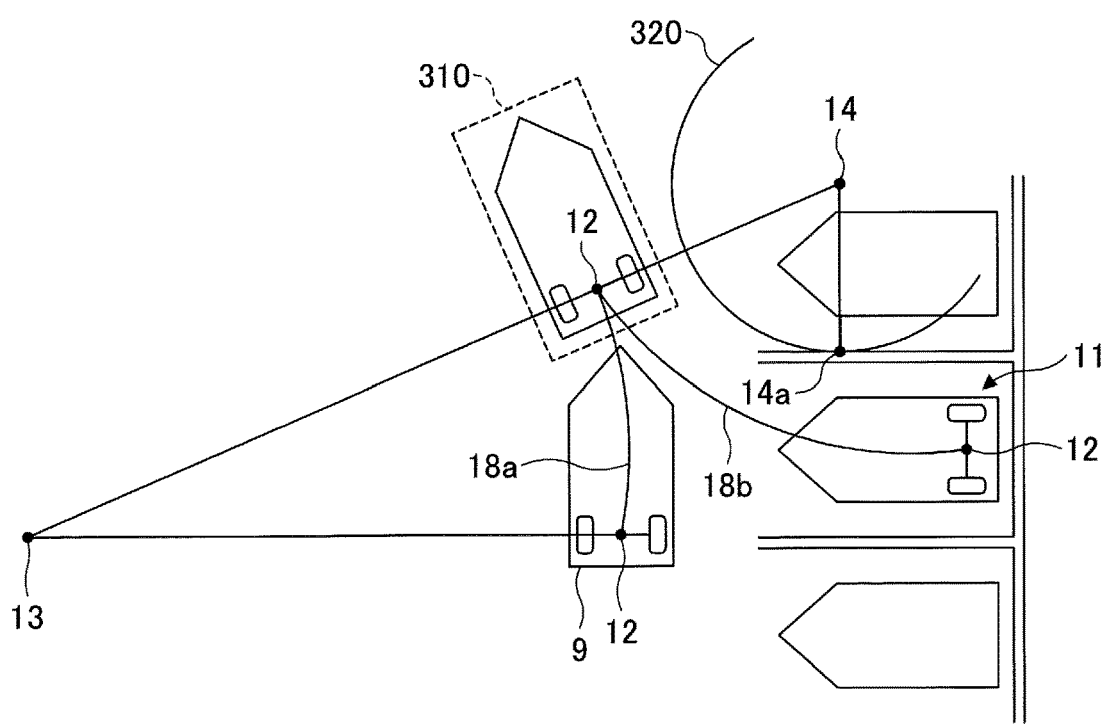

A driving trajectory 18 for automatic parking is estimated by using a known method as described in FIG. 7A and FIG. 7B. As an example, the driving trajectory 18 is affected by the steering angle, the speed of the vehicle, and the size of the wheels. Among them, the speed of the moving vehicle during automatic parking is low and can be thus regarded as approximately constant, and the size of the wheels is fixed. Therefore, in a simplified model, the driving trajectory 18 may be determined by the steering angle. Once the steering angle and the steering direction (turning direction) are known, a rotational center 19 and a rotation radius of the center 12 of the rear wheel axle are determined. The four corners of the vehicle body relative to the center 12 of the rear wheel axle are fixed. Thus, the coordinates of the four corners of the vehicle body can be calculated based on the coordinates of the center 12 of the rear wheel axle. The projection controller 33 causes the projectors 31 to project, as a driving trajectory, a trajectory of the coordinates of the four corners of the vehicle body determined in the above manner.

Figure 6:
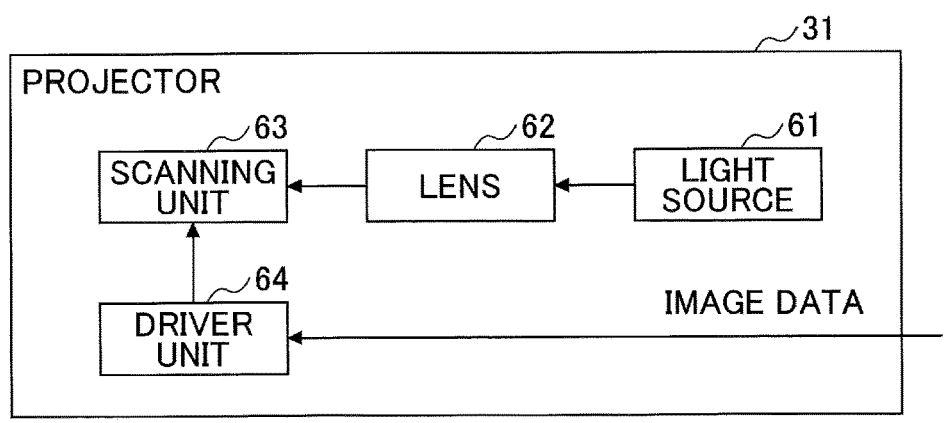
FIG. 6 is a drawing illustrating an example of the configuration of a projector.

Next, the configuration of a projector 31 will be described with reference to FIG. 6. FIG. 6 is a drawing illustrating an example of the configuration of the projector 31. As an example, the projector 31 includes a light source 61, a lens 62, a scanning unit 63, and a driver unit 64. The light source 61 may be a LED or a laser, and produces mainly visible light. The light source 61 preferably emits light of each of the three primary colors (RGB), but it is possible to project a recommended observation position in one color. The brightness of the light source 61 may be fixed. Preferably, the brightness of the light source 61 may be determined in accordance with the brightness of the surrounding area, which is detected by an illuminance sensor.

The lens 62 collects light generated by the light source 61 and forms a predetermined shape of light. The scanning unit 63 scans projection light over the road surface such that the projection light having a specific shape is projected, as controlled by the driver unit 64. For example, the scanning unit 63 may be a galvanometer mirror, an ultrasonic polarizer, or a digital micromirror device (DMD) used in digital light processing (DLP). These devices function to emit light in an instructed direction. By switching light emission directions in a short period of time, it appears to human eyes that an image has been rendered because of an afterimage.

The driver unit 64 functions to control the projecting direction of the scanning unit 63 based on the coordinates of image data. The driver unit 64 receives image data created by the projection controller 33, and controls the direction of light emitted by the scanning unit 63 so that the light of a specified color is projected to the coordinates indicated by the image data. Accordingly, projection light having the same shape as the image data is projected onto the road surface in the vicinity of the movable body 9.

<Determining Recommended Observation Position>

Prior to the description of a recommended observation position, estimation of driving trajectories for automatic parking will described with reference to FIG. 7A and FIG. 7B. FIG. 7A is a drawing illustrating an example of a parking method selection screen 301. The parking method selection screen 301 is displayed on the display 54 of the portable device 2 or a display 42 of the in-vehicle apparatus before the movable body owner starts automatic parking. The parking method selection screen 301 includes buttons 302 through 305 for selecting "parallel parking on the left side", "parking in a garage on the left side", "parallel parking on the right side", and "parking in a garage on the right side", respectively. The owner of the movable body 9 selects a button in accordance with the shape of the parking space 11 and the position of the movable body 9. Preferably, the movable body 9 stops near (such as immediately next to) the parking space 11. Alternatively, instead of the owner specifying a parking space 11, the parking controller 32 may locate a parking space 11 by using the sensor 36.

FIG. 7B is a drawing illustrating a method for estimating driving trajectories for parking in the parking space 11. In the following, an example of parking in a garage on the right side will be described.

(1) When a parking space 11 is specified, the parking controller 32 detects the parking space in the specified direction. Namely, if the sensor 36 is a camera, the camera detects the border of the parking space 11. If the sensor 36 is an ultrasonic sensor, the parking controller 32 uses ultrasound to detects the entire space of the parking space 11.

(2) Next, a turning position 310 is set on the diagonal upper right of the detected parking space 11. The turning position 310 may be automatically determined relative to the parking space 11 based on the minimum rotational radius or the like of the movable body 9.

(3) The parking control unit 32 determines a rotational center 13 used to move the movable body 9 to the turning position 310. For example, a point of intersection between an extension line of the axle passing through the current position and an extension line of the axle at the turning position may be determined as the rotational center 13. Therefore, a driving trajectory from the current position to the turning position is an arc centered on the rotational center 13. Because a radius of rotation is known, the steering angle can be determined by the parking controller 32.

(4) Next, a circular region 320 in which the movable body 9 interferes with walls or other vehicles when moving from the turning position 310 to the parking space 11 is determined. The circular region 320 is a circle centered on a point of intersection 14 between the extension line of the axle at the turning position, extending in the opposite direction to the rotational center 13, and a vertical line passing through a predetermined point 14a of the parking space 11. An optimum position for determining the circular region 320 (such as a position at 50 cm from the entrance of the parking space 11) is preliminarily determined as the predetermined point 14a. The radius of the circular region 320 is a distance from the point of intersection 14 to the predetermined point 14a of the parking space 11. However, if the circular region 320 does not cover the region in which the movable body 9 interferes with walls or other vehicles, circular region 320 may be slightly increased.

(5) A driving trajectory from the turning position 310 to the parking space 11 follows the arc of a circle centered on the point of intersection 14. Because the radius of rotation is known, the steering angle can be determined by the parking controller 32.

In the described manner, the driving trajectory 18a of the movable body 9 from the current position to the turning position and the driving trajectory 18b from the turning position to the parking space 11 can be estimated.

Figure 8:
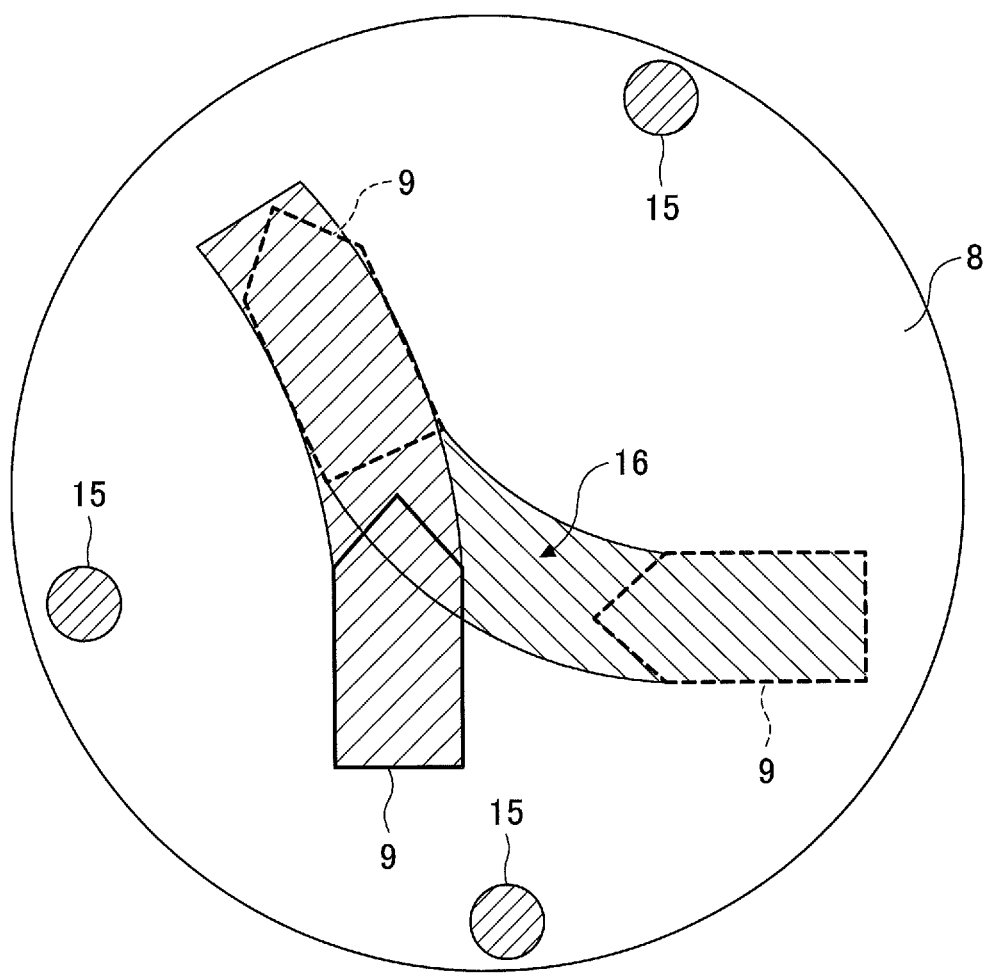
FIG. 8 is a drawing illustrating a method for determining a recommended observation position based on driving trajectories and a recommended observation range.

FIG. 8 is drawing illustrating an example of a method for determining the recommended observation position based on driving trajectories and the recommended observation range 8. Needless to say, the recommended observation position cannot be located within the four corners of the movable body 9 when the movable body 9 moves along the driving trajectory 18a from the current position to the turning position, and within the four corners of the movable body 9 when the movable body 9 moves along the driving trajectory 18b from the turning position to the parking space 11 (hereinafter referred to as a parking trajectory range 16).

The projection controller 33 determines the recommended observation position 15 within an area satisfying conditions that the recommended observation position 15 is located within the recommended observation range 8 and outside the parking trajectory range 16, and that there is no obstacle such as another vehicle. For example, the centroid of an area satisfying the above conditions may be set as a recommended observation position 15. By using the centroid, the center of the area satisfying the above conditions can be determined, and a certain distance from driving trajectories can be maintained. However, if the centroid is used, the recommended observation position 15 tends to be located in the vicinity of the center of the recommended observation range 8. Thus, instead of using the centroid, the recommended observation position 15 may be the outermost position of the recommended observation range 8 on a line connecting the centroid to the center of the recommended observation range 8, or may be the innermost position of the recommended observation range 8, which does not overlap the driving trajectories and located on the line connecting the centroid to the center of the recommended observation range 8.

The shape of the projection light 21 indicating the recommended observation position 15 may be a circular shape, a rectangular shape, or a polygonal shape, or may be a star shape or a footprint shape. The projection light 21 (such as the radius or the diagonal length of the recommended observation position 15) may have a size of several tens of centimeters allowing a person to stand at the position.

Note that the size of the recommended observation position 15 is not limited to several tens of centimeters allowing a person to stand at the position, and the recommended observation position 15 may be the entire area satisfying the conditions. In this case, the projectors 31 project projection light to the entire area satisfying the conditions. As the recommended observation range 8 is indicated to the owner of the movable body 9, the owner of the movable body 9 may move to any position of the area within the recommended observation range 8.

In FIG. 8, three recommended observation positions 15 are illustrated. This is a case where there are three separated areas satisfying the conditions, and three centers of gravity are found. In such a case, all the three recommended observation positions 15 may be employed, or the recommended observation position 15, closest to the driver's seat, may be employed such that the owner of the movable body 9 is not required to move by a large distance. Alternatively, the recommended observation position 15, closest to the parking space 11, may be employed. Because other vehicles do not approach the parking space 11 in which the movable body 9 is parked, the owner of the movable body 9 is unlikely to interfere with other vehicles while observing the movable body 9.

The projection controller 33 creates image data indicating a recommended observation position 15 (including the coordinates of the center of the recommended observation position 15, for example) determined in the above-described manner, and transmits the image data to the projectors 31. Accordingly, the projectors 31 can project the projection light 21 indicating the recommended observation position 15.

<Examples of Projection Light Beams>

Figure 9:
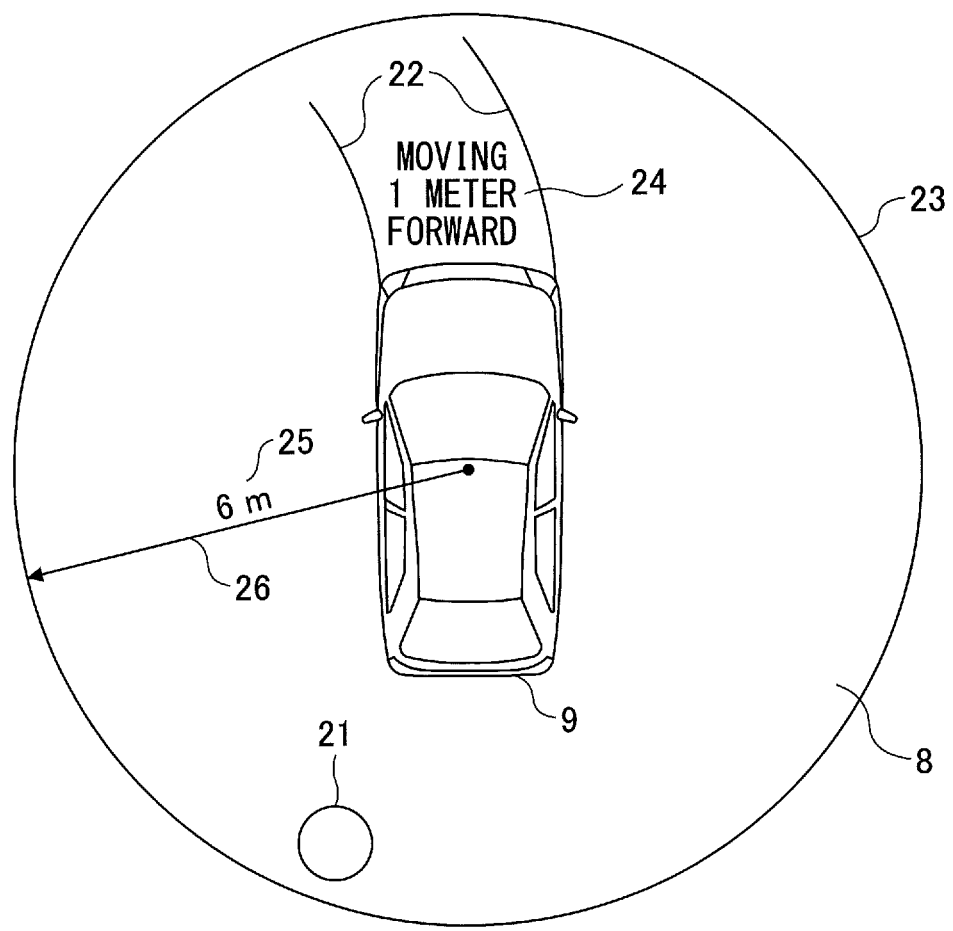
FIG. 9 is a drawing illustrating examples of projection light beams projected by projectors when the movable body is moved during automatic parking.

Examples of some projection light beams projected by the projection apparatus 1 for use with the movable body will be described with reference to FIG. 9. FIG. 9 is a drawing illustrating examples of projection light beams projected by projectors 31 when the movable body 9 is moved during automatic parking. In FIG. 9, in addition to the projection light 21 indicating the recommended observation position and the projection light 23 indicating the outer edge of the recommended observation range 8, the projection light 22 indicating a driving trajectory, projection light 24 indicating a message of "moving 1 meter forward", projection light 25 indicating a message of "6 meters", and projection light 26 indicating the size of the recommended observation range 8 are projected. By reading the message of "moving 1 meter forward", the owner of the movable body 9 understands that the movable body 9 is to be moved forward. Further, the message of "6 meters" allows the owner to understand that the projection light 23 indicating the outer edge of the recommended observation range 8 may represent a boundary determined by the laws and regulations.

<Projection Light for Assisting Occupant to Enter>

Figure 10A:
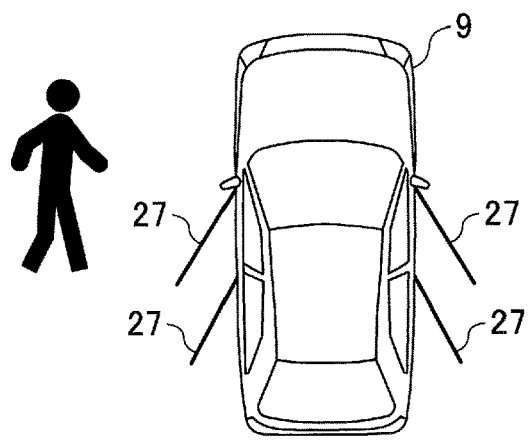

Next, referring to FIG. 10A through FIG. 10C, projection light for assisting an occupant to enter the movable body 9 will be described. Namely, the movable body 9 has already been parked (the movable body 9 has been either automatically parked or parked by a driver). Assisting the occupant means that assisting the occupant to enter the movable body 9 being parked. FIG. 10A illustrates projection light 27 indicating how much each of the doors may be opened. In this case, upon detection of the occupant by the entry detection sensor 43, the body ECU 35 determines, as a door to be opened, the door located closest to the occupant. Further, the entry detection sensor 43 detects a distance to an obstacle and the body size of the occupant. The body ECU 35 sets the distance to the obstacle as the upper limit, and within the upper limit, determines the amount of opening suitable for the body size of the occupant. The projection controller 33 creates image data based on the determined door and the amount of opening of the door, and transmits the image data to the projectors 31. In this case, the image data may indicate a straight line extending from a predetermined position of the door. Thus, the projectors 31 may project projection light simply indicating the amount of opening, or may project projection light indicating the angle of the straight line in accordance with the amount of opening.

Figure 10B:
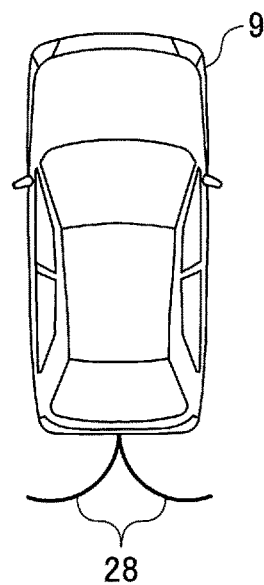

FIG. 10B is an example of projection light 28 indicating how much the rear door may be opened. Depending on the movable body 9, the rear door may be a double door (French door) having right and left doors that meet at the center and that can be respectively opened. In this case, the projectors 31 can project the projection light 28 indicating how much the right and left doors may be opened. If the rear door is not a double door, projection light can be projected in the same manner as in FIG. 10A.

Figure 10C:
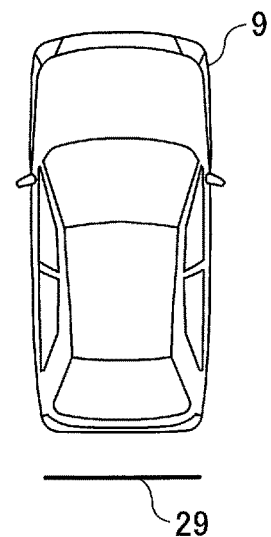

FIG. 10C also illustrates projection light 29 in the case of a rear door, particularly a hatchback-type rear door. Generally, the hatchback-type rear door is fully opened without stopping halfway. Thus, as the projection light 29, the projectors 31 may project light indicating a straight line, parallel to the width direction of the movable body 9, to a position a predetermined distance away from the rear end of the movable body 9. The position of the road surface onto which the projection light 29 is projected corresponds to the end of the fully-opened rear door.

<Displaying Information on Transparent Displays>

An occupant can see information from both inside and outside of the vehicle because the transparent displays 42 are transparent. In general, various types of information are considered to be displayed when the occupant is in the movable body 9. For example, immediately after the occupant enters the movable body 9, traffic congestion information and weather information may be displayed, for example. Thus, when the owner of the movable body 9 or the occupant sees the transparent displays 42 while outside the movable body 9, characters and graphics displayed on the transparent displays 42 may be laterally inverted.

Figure 11A:
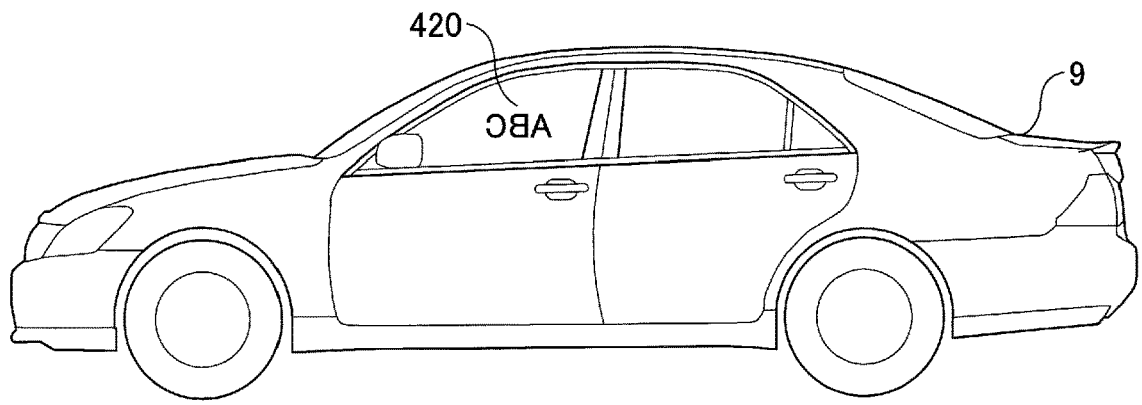
FIG. 11A through FIG. 11C are drawings illustrating an example of a method for generating information displayed on a transparent display.
Figure 11B:
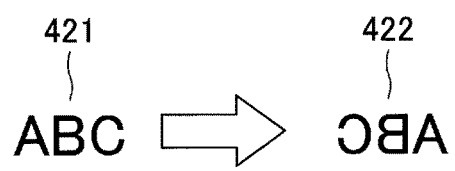
Figure 11C:
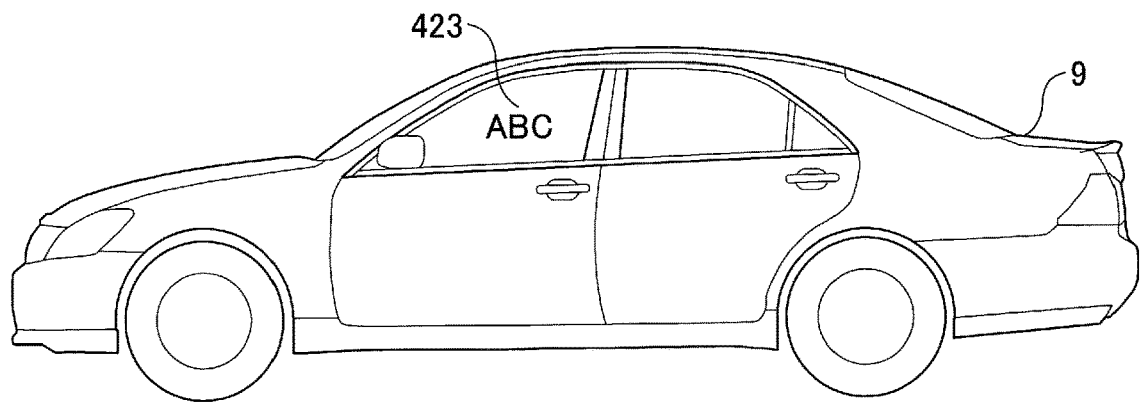

Referring to FIG. 11A through FIG. 11C, information displayed on a transparent display 42 will be described. FIG. 11A through FIG. 11C are drawings illustrating an example of a method for generating information displayed on the transparent display 42. FIG. 11A is a drawing illustrating characters 420 of "ABC" displayed for an occupant located in the movable body 9. Therefore, when the owner of the movable body 9 or an occupant located outside the vehicle sees the characters, the characters are flipped horizontally. Thus, the window display controller 41 performs a horizontal flipping process when displaying information for the owner of the movable body 9 or an occupant located outside the movable body 9.

FIG. 11B is a drawing illustrating an example of the horizontal flipping process. The left side of FIG. 11B depicts characters 421 of "ABC" before the horizontal flipping process, and the right side of FIG. 11B depicts characters 422 of "ABC" after the horizontal flipping process. When information is displayed for the owner of the movable body 9 or an occupant located outside the movable body 9, the window display controller 41 displays, on the transparent display 42, the information on the right side of FIG. 11B, which is illustration when viewed from the inside of the movable body 9.

FIG. 11C is a drawing illustrating an example of information displayed on the transparent display 42 after the horizontal flipping process. In FIG. 11C, characters 423 of "ABC" can be read from the outside of the vehicle.

Next, referring to FIG. 12A through FIG. 12C, some messages displayed on transparent displays 42 will be described. Note that the transparent displays 42 are used at the time of automatic parking and to assist an occupant to enter the movable body 9.

FIG. 12A is a drawing illustrating an example of information displayed on the front display 42a at the time of automatic parking. Driving trajectories to the parking space 11 are determined in the process of determining a recommended observation position. Thus, whether or not the movable body 9 moves forward or backward is also determined. When the movable body 9 moves forward, the window display controller 41 displays a message 71 such as "moving 1 meter forward" on the front display 42a.

Further, when the movable body 9 is turned from the turning position, the window display controller 41 displays a message such as "moving 3 meters backward" on the rear display 42f. It may be difficult for the owner of the movable body 9 located outside the movable body 9 to determine whether the movable body 9 is moving forward or backward. However, by looking at the transparent displays 42, the owner readily understand the moving direction of the movable body 9.

In addition, when the movable body 9 is stopped due to an obstacle, a message such as "stopped due to an obstacle" may be displayed. Accordingly, the owner located outside the movable body 9 understands the reason why the movable body 9 has stopped.

FIG. 12B is a drawing illustrating an example of information displayed on the left front door display 42d when an occupant is assisted in entering the movable body 9. In FIG. 12B, a message 72 indicating "welcome, the door will open after 3 seconds" is displayed. The window display controller 41 displays the message for a certain period of time, and starts a countdown as illustrated in FIG. 12C.

In FIG. 12C, messages "3", "2", "1", and "open" are displayed in chronological order. When window display controller 41 indicates, to the projection controller 33, that the message "open" is displayed, the projection controller 33 indicates, to the body ECU 35, that the message "open" is displayed. Then, the body ECU 35 opens the door. Accordingly, the occupant can understand the timing at which the door is opened. During this time, projection light 27 indicating how much the door may be opened is projected by the projection controller 33.

The messages displayed by the window display controller 41 as illustrated in FIG. 12A through FIG. 12C are merely examples, and various types of information for assisting the occupant to enter the movable body 9 may be displayed.

<Information Displayed by Portable Device>

The projection controller 33 projects projection light onto the road surface as described above. In addition, it is also effective for the portable device 2 to display information equivalent to the projection light.

Figure 13:
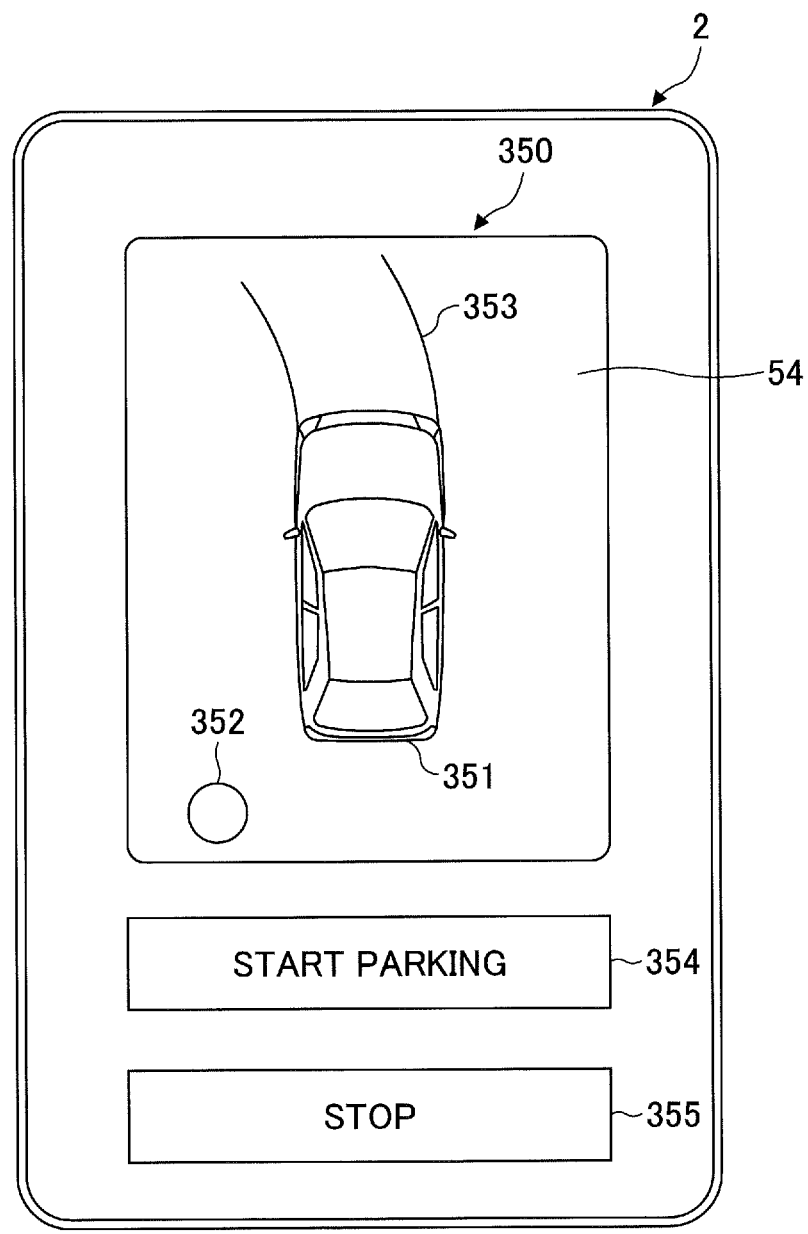
FIG. 13 is a drawing illustrating an example of an automatic parking screen displayed on a display of the portable device.

FIG. 13 is an example of an automatic parking screen 350 displayed on the display 54 of the portable device 2. The automatic parking screen 350 of FIG. 13 displays a birds-eye view of the movable body 9 viewed from overhead. A vehicle icon 351 is displayed at the center. In addition, a recommended observation position icon 352 indicating a recommended observation position and driving trajectory lines 353 are displayed.

It becomes possible to display the automatic parking screen 350 by causing the communication unit 34 to transmit, to the portable device 2, coordinates of a recommended observation position 15 and coordinates of a driving trajectory. The portable device 2 places the pre-stored vehicle icon 351 at the center, and displays the recommended observation position icon 352 on the automatic parking screen 350 based on the coordinates of the recommended observation position 15. Further, the portable device 2 connects the coordinates of the driving trajectory, and displays the driving trajectory lines 353.

By causing the portable device 2 to display information equivalent to projection light, the owner of the movable body 9 can understand a recommended observation position even if the projectors 31 are unable to project projection light, or if projection light is projected in a blind spot of the movable body 9 and the owner of the movable body 9 is thus unable to visually recognize the projection light.

Further, the portable device 2 includes a "start parking" button 354 and a "stop" button 355. The "start parking" button 354 may be pressed by the owner to start automatic parking. When this button is pressed, the portable device 2 transmits, to the projection apparatus 1, operation information for starting automatic parking. The projection apparatus 1 starts automatic parking after verifying the safety of the surrounding area. The "stop" button 355 may be pressed by the owner to stop the movable body 9. For example, if the movable body 9 approaches an obstacle, the owner presses the "stop" button 355. When the portable device 2 transmits, to the projection apparatus 1, operation information for stopping the movable body 9, the projection apparatus 1 stops the movable body 9. If the "start parking" button 354 is pressed thereafter, automatic parking is resumed.

Note that the display 54 of the portable device 2 may be a touch panel, and may include various types of buttons such as buttons for opening and closing the doors.

<Operational Procedure>

Figure 14:
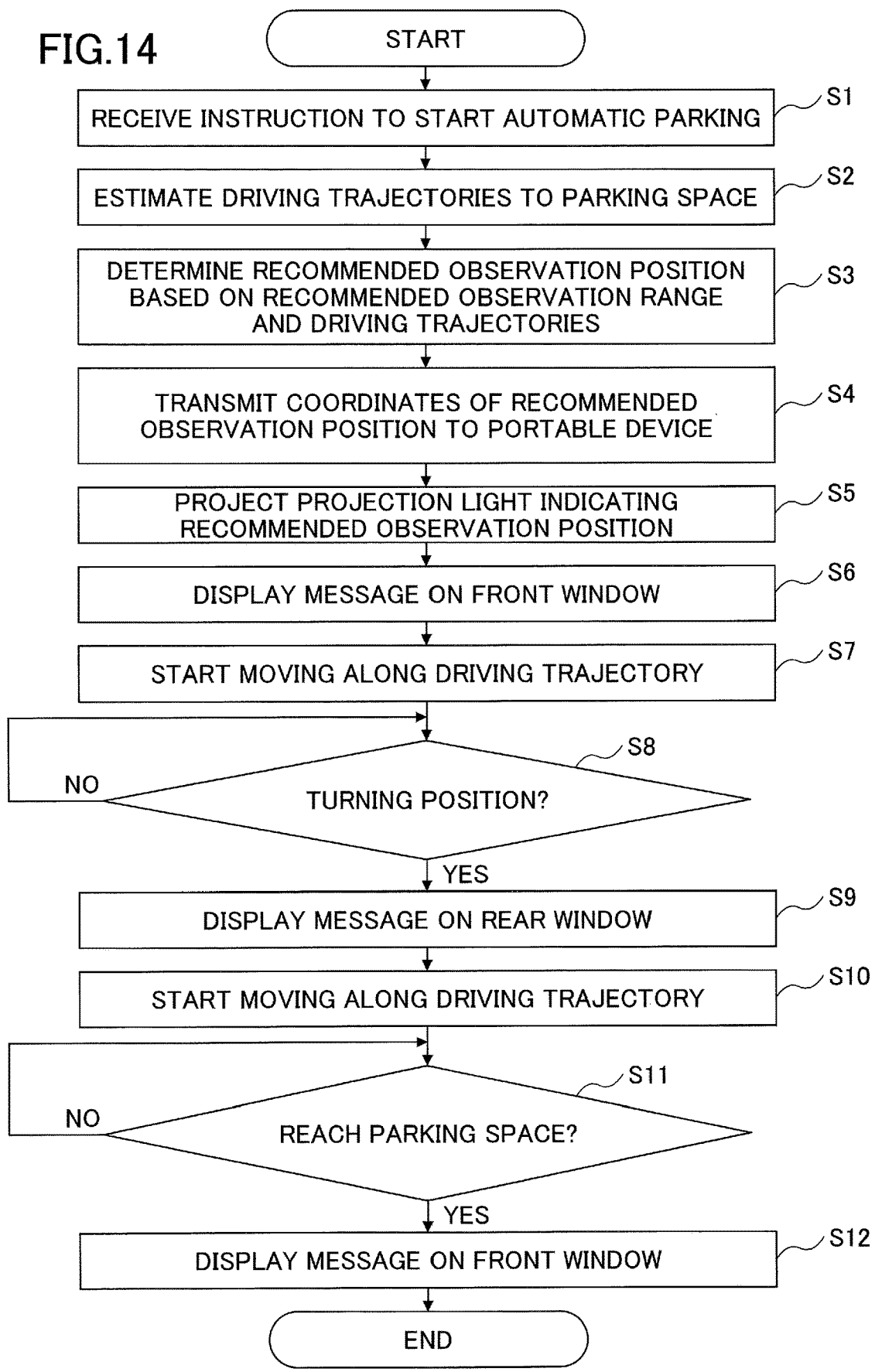
FIG. 14 is a flowchart illustrating an example of a process in which the projection apparatus projects projection light and displays information on transparent displays at the time of automatic parking.

Referring to FIG. 14, a process in which the projection apparatus 1 for use with the movable body projects projection light and displays information on transparent displays 42 will be described. FIG. 14 is a flowchart illustrating an example of a process in which the projection apparatus 1 projects projection light and displays information on transparent displays 42 at the time of automatic parking.

First, the parking controller 32 receives an instruction to start automatic parking (S1). It is assumed that the portable device 2 receives an instruction to start automatic parking and transmits the received instruction to the movable body 9. However, the parking controller 32 may receive an instruction within the movable body 9. After the owner of the movable body 9 performs an operation for starting automatic parking in the movable body 9, the owner may move beyond the movable body 9 or may stay in the movable body 9.

The parking controller 32 estimates driving trajectories to the parking space 11 (S2). The details have been described with reference to FIGS. 7A and 7B. If the parking controller 32 is unable to estimate driving trajectories due to an obstacle, the parking controller 32 may display a message, such as "please change the parking space 11" or "please move the movable body 9", on the display 54 of the portable device 2 or a display of the in-vehicle apparatus.

The projection controller 33 determines a recommended observation position 15 based on the recommended observation range 8 and the driving trajectories (S3). The projection controller 33 transmits coordinates of the recommended observation position 15 to the portable device 2 (S4). The projection controller 33 may transmit coordinates of the recommended observation range 8. As the recommended observation range 8 is fixed, the coordinates of the recommended observation range 8 are known to the portable device 2. Further, the coordinates of the recommended observation position 15 are not required to be continuously transmitted to the portable device 2, and may be transmitted to the portable device 2 only when an obstacle is detected near the projectors 31.

Next, the projection controller 33 transmits image data indicating the recommended observation position 15 to the projectors 31. The projectors 31 project the projection light 21 indicating the recommended observation position 15 (S5).

Further, the projection controller 33 determines whether the movable body 9 moves forward or backward based on a driving trajectory. When the movable body 9 moves forward, the projection controller 33 requests the window display controller 41 to display a predetermined message on the front window. Accordingly, when the projection light 21 indicating the recommended observation position 15 is projected at the same time when the message indicating moving forward is displayed on the front window (S6).

Next, the parking controller 32 causes the movable body 9 to start moving along the driving trajectory (S7). Before the movable body 9 starts moving, the parking controller 32 may request permission from the owner of the movable body 9. Further, the position of the recommended observation position 15 relative to the movable body 9 is changed as the movable body 9 moves. For this reason, the coordinates of the recommended observation position 15 relative to the movable body 9 are repeatedly calculated in accordance with translation and rotation (change in the angle of yaw) with respect to a reference position such as the center of the movable body 9 before movement, and the latest image data indicating the recommended observation position 15 is transmitted to the projectors 31. This prevents a change in the position of the projection light 21 indicating the recommended observation position 15. After the movable body 9 starts moving, the projection of the projection light 21 may stop.

The parking controller 32 controls the steering ECU 37 and the engine ECU 38 when moving the movable body 9 along the driving trajectory. Because the radius of rotation for the driving trajectory is known, the movable body 9 may move at a constant speed with a constant steering angle.

The parking controller 32 determines whether the movable body 9 has reached a turning position based on the amount of movement detected from the wheel rotation pulses or the like (S8). The parking controller 32 continues to move the movable body 9 until the movable body 9 reaches the turning position.

When the movable body 9 has reached the turning position (yes in S8), the moving direction of the movable body 9 changes. Thus, the projection controller 33 requests the window display controller 41 to display a predetermined message on the rear window. Accordingly, the message indicating moving backward is displayed on the rear window (S9).

The parking controller 32 causes the movable body 9 to start moving along a driving trajectory estimated for backward movement (S10). Because the steering direction is reversed, the steering ECU 37 changes the steering angle based on the radius of rotation for the driving trajectory estimated for backward movement.

The parking controller 32 determines whether the movable body 9 has reached the parking space 11 based on the amount of movement detected from the wheel rotation pulses or the like (S11). It is more preferable to use a sensor to determine whether the movable body 9 has entered the parking space 11. The parking controller 32 continues to move the movable body 9 until the movable body 9 reaches the parking space 11.

When the movable body 9 has reached the parking space 11 (yes in S11), the projection controller 33 requests the window display controller 41 to display a predetermined message on the front window. As a result, the message indicating the completion of automatic parking is displayed (S12). Accordingly, the owner of the movable body 9 can check the completion of automatic parking from the outside of the movable body 9.

Figure 15:
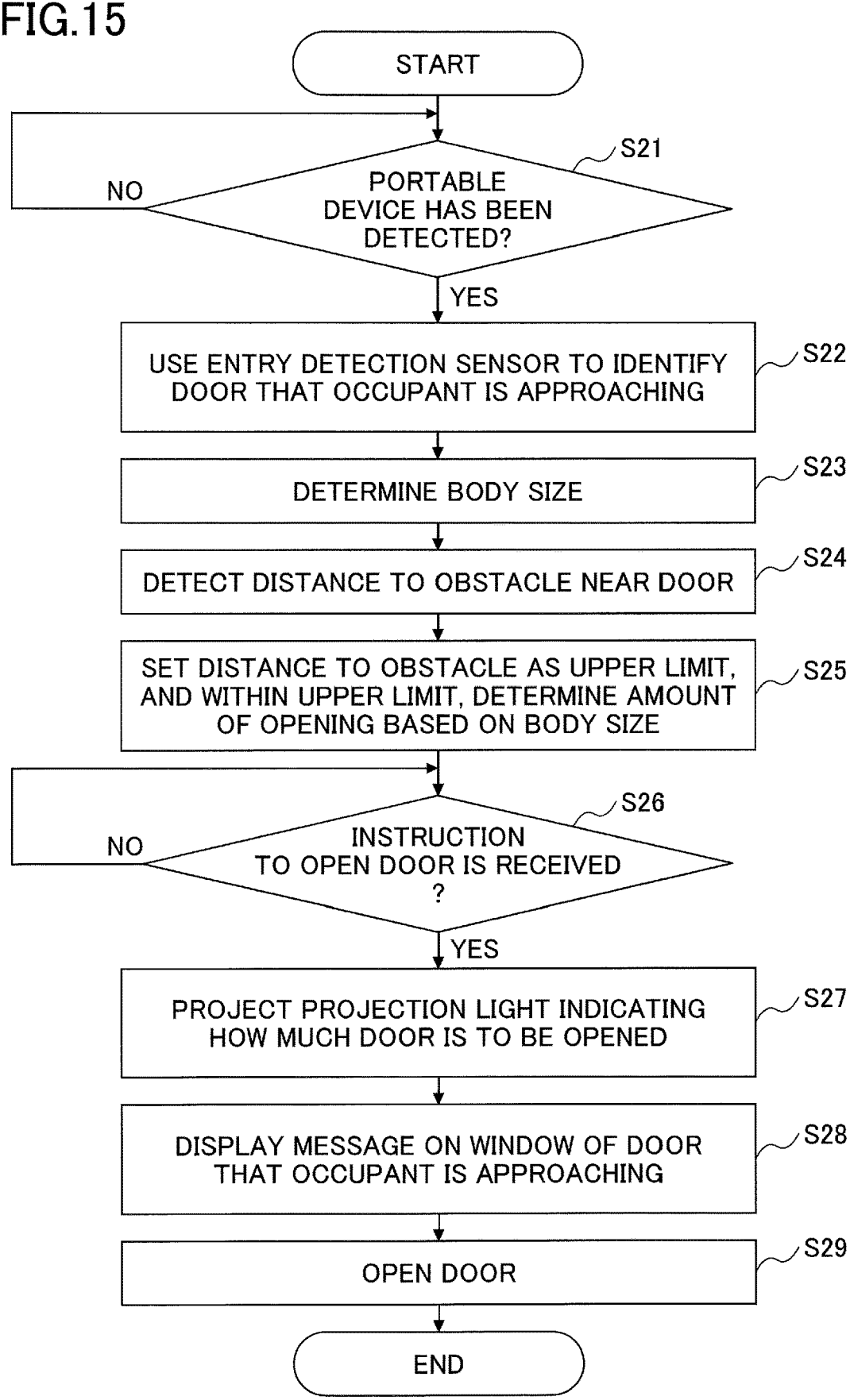
FIG. 15 is a flowchart illustrating an example of a process in which the projection apparatus projects projection light and displays information on transparent displays when assisting an occupant to enter the movable body.

Next, referring to FIG. 15, projecting projection light and displaying information on transparent displays 42 when assisting an occupant to enter the movable body 9 will be described. FIG. 15 is a flowchart illustrating an example of a process in which the projection apparatus 1 for use with the movable body projects projection light and displays information on transparent displays 42 when assisting an occupant to enter the movable body 9.

The communication unit 34 transmits a radio wave for searching the portable device 2 within a predetermined distance from the movable body 9 being parked. The communication unit 34 determines whether the portable device 2 has been detected (S21).

When the portable device 2 has been detected (yes in S21), the body ECU 35 uses the entry detection sensor 43 to identify a door that an occupant is approaching (S22).

The entry detection sensor 43 determines the body size of the occupant (S23). For example, the entry detection sensor 43 may use a stereo camera to perform three-dimensional measurements and determine the body size, such as large, medium, or small. In this case, even if the occupant carries luggage, the body size of the occupant carrying luggage can be determined. In addition, the body size may be determined based on attribute information associated with an ID transmitted from the portable device 2. Further, the entry detection sensor 43 may identify the occupant using face recognition, and may determine the body size based on the weight of the occupant previously detected by a pressure sensor installed in a vehicle seat.

Next, the entry detection sensor 43 detects the distance to an obstacle near the door (S24). Preferably, the distance to an obstacle is detected in step S21 before the occupant is detected, because the obstacle may be misidentified as the occupant.

Next, the body ECU 35 sets the distance to the obstacle as the upper limit, and within the upper limit, determines the amount of opening based on the body size (S25). For example, if the body size is large and no obstacle is detected, 50 cm preliminarily associated with the large body size is set as the amount of opening. Further, if the body size is large and the distance to a detected obstacle is 40 cm, 40 cm is set as the amount of opening.

Next, the projection controller 33 determines whether an instruction to open the door is received from the portable device 2 (S26). This is to determine whether the occupant desires to enter the vehicle. In addition, this prevents the door from being opened if the occupant is simply moving near the movable body. When the occupant presses a predetermined button on the portable device 2, the communication unit 51 of the portable device 2 transmits an instruction to open the door to the communication unit 34 of the projection apparatus 1 for use with the movable body.

When the instruction to open the door is received (yes in S26), the projection controller 33 projects projection light indicating how much the door may be opened, in accordance with the amount of opening obtained from the body ECU 35 (S27).

Then, the projection controller 33 requests the window display controller 41 to display a predetermined message on the window of the door that the occupant is approaching. As a result, a message indicating the opening of the door is displayed (S28).

When the projection control unit 33 indicates, to the body ECU 35, that the message has been displayed, the body ECU 35 opens the door that the occupant is approaching (S29). Accordingly, the timing of opening the door and displaying the message can be synchronized. The timing may be controlled by the body ECU 35, instead of controlled by the projection controller 33. In this case, when the body ECU 35 receives the instruction to open the door in step S26, the body ECU 35 indicates, to the projection controller 33, the number of seconds after which the door is to be opened. Further, the projection controller 33 indicates, to the window display controller 41, the number of seconds after which the door is to be opened. The window display controller 41 displays a message that counts down the number of seconds. Accordingly, the timing of opening the door and displaying the message can be synchronized in this case as well.

Summary

As described above, the projection apparatus 1 for use with the movable body according to the present embodiment estimates a position that is located within the recommended observation range 8 and that does not overlap driving trajectories. Further, the projection apparatus 1 for use with the movable body according to the present embodiment projects the projection light 21 indicating a recommended observation position to the estimated position. Accordingly, the owner of the movable body 9 is able to observe the movable body 9 at the recommended observation position that is located within the recommended observation range 8 and that does not overlap the driving trajectories, instead of instinctively determining an approximate distance from the movable body 9. Further, a message indicating whether the movable body 9 moves forward or backward is displayed on a transparent display 42. Thus, the owner of the movable body 9 is able to understand the moving direction of the movable body 9. Further, when an occupant enters the movable body 9, the amount of opening of the door is projected, and a transparent display 42 displays a message indicating that the door is to be opened.

Second Embodiment

In a second embodiment, a projection apparatus 1 that uses a voice message to prompt the owner of the movable body to enter the recommended observation range 8 will be described.

<Process Overview>

Figure 16:
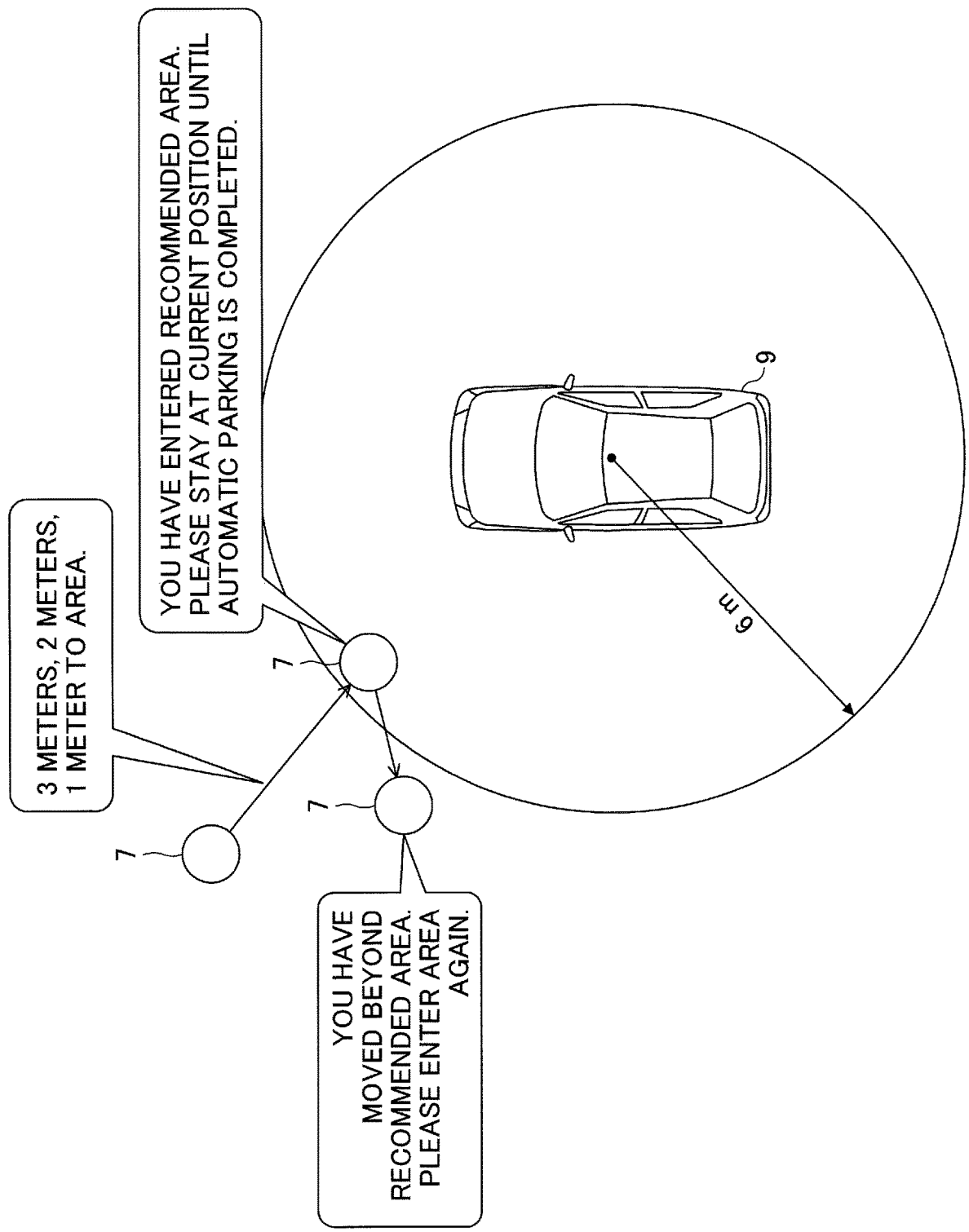
FIG. 16 is a drawing illustrating an overview of a voice message transmitted from a projection apparatus and the positions of the owner of the movable body.

FIG. 16 is a drawing illustrating an overview of a voice message transmitted from the projection apparatus 1 for use with the movable body according to the second embodiment and the positions of the owner of the movable body 9. As described in the first embodiment, the recommended observation range 8 is a predetermined distance from the current position of the movable body 9. The projection apparatus 1 transmits a voice message prompting an owner 7 of the movable body 9 to move within the recommended observation range 8, and the portable device 2 outputs the voice message.

(1) For example, when the owner 7 of the movable body 9 approaches the recommended observation range 8 from the outside of the recommended observation range 8, the portable device 2 outputs a voice message that counts down the distance from the owner 7 to the recommended observation range 8, such as "3 meters, 2 meters, 1 meter to the area". Accordingly, the owner 7 of the movable body 9 understands that the owner 7 is gradually approaching the recommended observation range 8, and can figure out how much closer the owner 7 needs to approach.

(2) When the owner 7 of the movable body 9 has entered the recommended observation range 8, the portable device 2 outputs a voice message such as "you have entered the recommended area. Please stay at the current position until automatic parking is completed." Accordingly, the owner 7 of the movable body 9 understands that the owner 7 can stay at the current position.

(3) If the owner 7 of the movable body 9 moves beyond the recommended observation range 8 after entering the recommended observation range 8, the portable device 2 outputs a voice message such as "you have moved beyond the recommended area. Please enter the area again." Accordingly, the owner 7 of the movable body 9 understands that the owner 7 has moved beyond the recommended observation range 8 and needs to approach the movable body to enter the recommended observation range 8 again.

As described above, the projection apparatus 1 according to the present embodiment causes the portable device 2 to output a voice message prompting the owner 7 of the movable body 9 to move within the recommended observation range 8, in addition to projecting projection light and causing the portable device 2 to display an overhead view. Accordingly, the owner 7 of the movable body 9 can more securely observe the movable body 9 during automatic parking at a position within the recommended observation range 8.

Configuration Example

Figure 17:
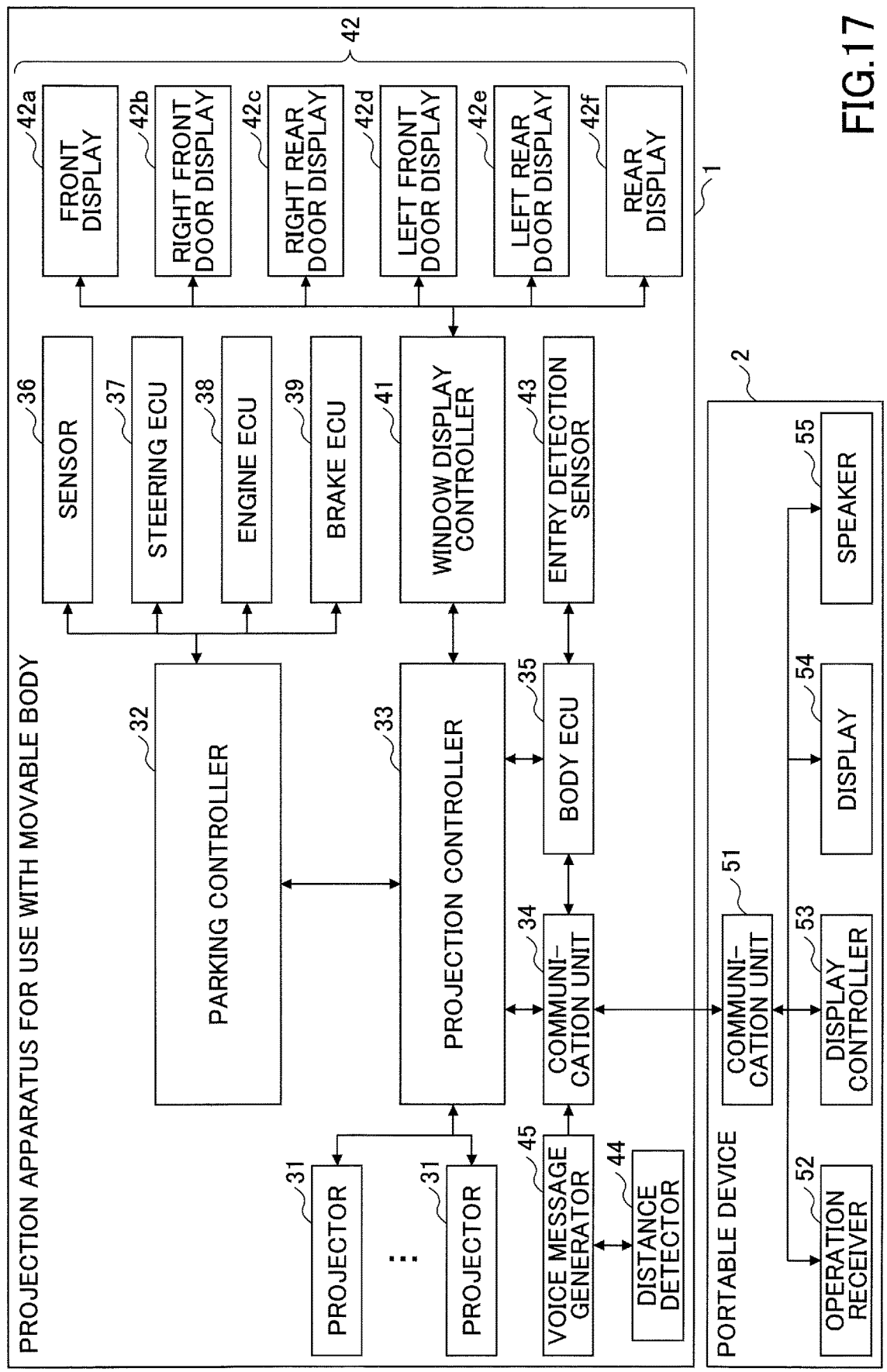
FIG. 17 is a drawing illustrating an example configuration of the projection apparatus installed in the movable body and an example configuration of a portable device.

FIG. 17 is a drawing illustrating an example configuration of the projection apparatus 1 installed in the movable body 9 and an example configuration of the portable device 2. In FIG. 17, the elements denoted by the same reference numerals as the elements of FIG. 4 have similar functions. Thus, only the main elements of the present embodiment may be described.

The projection apparatus 1 according to the present embodiment further includes a voice message generator 45 and a distance detector 44. First, the distance detector 44 repeatedly detects a distance to the owner of the movable body 9. For example, a distance to the owner of the movable body 9 may be detected based on the strength of a radio wave received by the communication unit 34 from the portable device 2. The communication unit 51 of the portable device 2 transmits the strength of a radio wave at the time of output to the projection apparatus 1. Thus, the distance detector 44 compares the strength of a received radio wave to the strength of a radio wave at the time of output, and coverts to a distance. Alternatively, the distance detector 44 may use a stereo camera to detect a distance to the owner of the movable body 9, or may use a laser, light detection and ranging (LIDAR), or an ultrasonic sensor to detect a distance to the owner of the movable body 9.

The voice message generator 45 generates a voice message based on the distance detected by the distance detector 44, based on whether the owner of the movable body 9 is located inside or outside the recommended observation range 8, and based on the moving direction of the owner the movable body 9. The details will be described below. When the communication unit 51 of the portable device 2 receives the voice message, the voice message is output from a speaker 55 in real time.

<Operational Procedure>

FIG. 18 is flowchart illustrating an example of a process in which the portable device 2 outputs a voice message generated by the voice message generator 45. The process of FIG. 18 starts when automatic parking is started.

First, the distance detector 44 detects a distance to the owner of the movable body 9 (S31). The distance is measured repeatedly or periodically.

The voice message generator 45 determines whether the owner of the movable body 9 is located outside the recommended observation range 8, based on the distance to the owner of the movable body 9 (S32).

When it is determined as "no" in step S32, the owner of the movable body 9 is located within the recommended observation range 8. Thus, the voice message generator 45 generates a voice message prompting the owner to stay within the recommended observation range 8 (S36). The voice message is transmitted to the portable device 2, and the portable device 2 outputs the voice message, such as "you have entered the recommended area. Please stay at the current position until automatic parking is completed." When the owner of the movable body 9 has entered the recommended observation range 8 once, a flag A is turned on. While the flag A is turned on, the voice message of step S36 is not generated.

When it is determined as "yes" in step S32, the voice message generator 45 turns the flag A off, and determines whether the owner of the movable body 9 has ever entered the recommended observation range 8 after the start of the automatic parking (S33). The voice message generator 45 determines whether the owner has ever entered the recommended observation range 8 before based on the flag A of step S36.

When it is determined as "no" in step S33, the voice message generator 45 generates a voice message indicating the distance to the recommended observation range 8 (S34). The voice message is transmitted to the portable device 2, and the portable device 2 outputs the voice message, such as "3 meters to the area". As the distance to the owner of the movable body 9 decreases, voice messages such as "2 meters to the area" and "1 meter to the area" can be output.

When it is determined as "yes" in step S33, the voice message generator 45 generates a voice message prompting the owner to enter the recommended observation range 8 again (S35). The voice message is transmitted to the portable device 2, and the portable device 2 outputs the voice message, such as "you have moved beyond the recommended area. Please enter the area again."

As describe above, the projection apparatus 1 according to the present embodiment causes the portable device 2 to output a voice message prompting the owner of the movable body 9 to move within the recommended observation range 8.

In FIG. 17, the projection apparatus 1 includes the voice message generator 45 and the distance detector 44. However, the portable device 2 may include the voice message generator 45 and the distance detector 44. In this case, the portable device 2 generates a voice message and outputs the voice message from the speaker 55.

If the portable device 2 generates a voice message, transmitting and receiving the voice message is not required. If the projection apparatus 1 generates a voice message, projecting projection light and displaying the voice message can be readily synchronized. For example, when the owner of the movable body 9 enters the recommended observation range 8, it is possible to project the projection light 23 indicating the outer edge of the recommended observation range 8 while also outputting a voice message.

Other Application Examples

Although the embodiments of the present invention have been described above, the present invention is not limited the above-described embodiment. Various variations and modifications may be made without departing from the scope of the present invention.

For example, the occupant detecting sensor has been described as a camera installed in the vehicle; however, the occupant detecting sensor may be a camera installed at the entrance of an occupant's house. In this case, the camera installed at the entrance communicates with the projection apparatus 1, and indicates, to the projection apparatus 1, the body size of the occupant before entering the vehicle.

Further, the recommended observation range 8 is not required to have a circular shape. In addition, instead of the predetermined distance (6 m) from the center of the movable body 9, a predetermined distance from the outer edge of the recommended observation range 8 may be used as the recommended observation range 8.

Further, information such as "the trunk will open" may be displayed on the transparent display of the rear door.

Further, in the above-described embodiments, a recommended observation position at the time of parking has been described. However, in other situations such as a vehicle leaves from a garage and the owner of the vehicle is not located within the vehicle, a recommended observation position at which the owner observes the vehicle may be used.

Further, in the above-described embodiments, the projection apparatus 1 for use with the movable body calculates driving trajectories for parking, and determines a recommended observation position. However, a server may determine driving trajectories and a recommended observation position, and may transmit the driving trajectories and the recommended observation position to the projection apparatus 1 for use with the movable body. In this case, surrounding information obtained by the sensor 36 is transmitted from the projection apparatus 1 for use with the movable body transmits to the server, and one or both of the driving trajectories and the recommended observation position are transmitted to the projection apparatus 1 for use with the movable body.

What is claimed is:

1. A projection apparatus for use with a movable body, the projection apparatus comprising:
   a parking controller configured to cause the movable body to automatically move to a parking space; and
   a projector configured to project light onto a road surface in vicinity of the movable body,
   wherein, when the parking controller causes the movable body to automatically park in the parking space, the projector projects the light onto the road surface located within a predetermined distance from the movable body,
   wherein the light projected by the projector onto the road surface indicates a text message,
   wherein the projection apparatus further comprises
   a controller unit configured to set a distance to an obstacle from the movable body as an upper limit of amount of opening a door of the movable body and determine the amount of opening that is suitable for a body size of an occupant within the upper limit,
   a communication unit configured to communicate with a portable device carried by an occupant who enters the movable body; and
   an occupant detecting sensor configured to detect the occupant who enters the movable body, and
   wherein, when the communication unit communicates with the portable device, and the occupant who enters the movable body is detected, the projector projects light indicating the amount of opening of the door to which the detected occupant is approaching.

2. The projection apparatus for use with the movable body according to claim 1, wherein, when the parking controller causes the movable body to automatically park in the parking space, the projector projects light indicating an outer edge of a range of the predetermined distance from the movable body.

3. The projection apparatus for use with the movable body according to claim 1, wherein, when the parking controller causes the movable body to automatically park in the parking space, the projector projects light indicating the driving trajectory of the movable body.

4. The projection apparatus for use with the movable body according to claim 1, further comprising:
   a transparent display disposed on at least one of a front window, door windows, and a rear window to display information; and
   a display controller configured to display, on the transparent display, information indicating that the movable body is in motion or indicating a moving direction of the movable body, when the parking controller causes the movable body to automatically park in the parking space.

5. The projection apparatus for use with the movable body according to claim 1, wherein, when the communication unit communicates with the portable device, and the occupant who enters the movable body is detected, the display controller displays, on a transparent display of the door to which the detected occupant is approaching, a countdown of time until the door is opened.

6. The projection apparatus for use with the movable body according to claim 1, wherein the text message indicates a moving distance and a moving direction during automatically parking.

7. The projection apparatus for use with the movable body according to claim 1, wherein the size of the occupant is detected by a camera that is configured to capture an image of an outside of the movable body or by associating an ID transmitted from the portable device with occupant's attributes.

8. The projection apparatus for use with the movable body according to claim 2, further comprising:
   a communication unit configured to communicate with a portable device carried by an occupant who enters the movable body;
   a distance detector configured to detect a distance to the portable device; and a voice message generator configured to generate a voice message in accordance with whether the distance to the portable device is smaller or larger than the predetermined distance within which the light indicating the outer edge is projected, and wherein the communication unit transmits the voice message generated by the voice message generator to the portable device.

9. The projection apparatus for use with the movable body according to claim 2, wherein the light projected by the projector onto the road surface located within the predetermined distance from the movable body and indicating the recommended position for the person to observe the movable body is different from the light indicating the outer edge of the range of the predetermined distance from the movable body.

10. A portable device for communication with a projection apparatus for use with a movable body, the projection apparatus including a parking controller configured to cause the movable body to automatically park in a parking space, and a projector configured to project light onto a road surface in vicinity of the movable body, wherein the portable device is configured to receive position information indicating a position located within a predetermined distance from the movable body, from the projection apparatus upon transmitting an instruction requesting the parking controller to start automatic parking to the projection apparatus, and highlight and display the position indicated by the position information in overhead view around the movable body, wherein the portable device is further configured to display a text message together with the position, wherein the projection apparatus further comprises a controller unit configured to set a distance to an obstacle from the movable body as an upper limit of amount of opening a door of the movable body and determine the amount of opening that is suitable for a body size of an occupant within the upper limit, a communication unit configured to communicate with a portable device carried by an occupant who enters the movable body; and an occupant detecting sensor configured to detect the occupant who enters the movable body, and wherein, when the communication unit communicates with the portable device, and the occupant who enters the movable body is detected, the projector projects light indicating the amount of opening of the door to which the detected occupant is approaching.

11. A non-transitory recording medium storing a program for causing a portable device configured to communicate with a projection apparatus for use with a movable body to execute a process, the projection apparatus including a parking controller configured to cause the movable body to automatically park in a parking space, and a projector configured to project light onto a road surface around the movable body, the process comprising:

receiving position information indicating a position located within a predetermined distance from the movable body, from the projection apparatus upon transmitting an instruction requesting the parking controller to start automatic parking to the projection apparatus, and highlighting and displaying the position indicated by the position information in an overhead view around the movable body, wherein the portable device is further configured to display a text message together with the position, wherein the process is further comprising:

setting a distance to an obstacle from the movable body as an upper limit of amount of opening a door of the movable body and determining the amount of opening that is suitable for a body size of an occupant within the upper limit, communicating with a portable device carried by an occupant who enters the movable body;

detecting the occupant who enters the movable body; and when the communication unit communicates with the portable device, and the occupant who enters the movable body is detected, projecting light indicating the amount of opening of the door to which the detected occupant is approaching.

* * * * *